(12) United States Patent
Liu et al.

(10) Patent No.: US 12,389,266 B2
(45) Date of Patent: Aug. 12, 2025

(54) SIDELINK INFORMATION TRANSMISSION METHOD, TERMINAL, AND CONTROL NODE

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Na Li, Chang'an Dongguan (CN); Shixiao Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 228 days.

(21) Appl. No.: 17/581,733

(22) Filed: Jan. 21, 2022

(65) Prior Publication Data

US 2022/0150000 A1    May 12, 2022

Related U.S. Application Data

(63) Continuation of application No. PCT/CN2020/102704, filed on Jul. 17, 2020.

(30) Foreign Application Priority Data

Jul. 24, 2019    (CN) .................. 201910673336.7

(51) Int. Cl.
| | |
|---|---|
| *H04L 1/1829* | (2023.01) |
| *H04L 1/1867* | (2023.01) |
| *H04L 5/00* | (2006.01) |
| *H04W 28/04* | (2009.01) |

(Continued)

(52) U.S. Cl.
CPC ........... *H04W 28/04* (2013.01); *H04L 1/1854* (2013.01); *H04L 1/1861* (2013.01);
(Continued)

(58) Field of Classification Search
CPC . H04L 1/0001–1896; H04L 2001/0092–0098; H04L 5/0001–0098;
(Continued)

(56) References Cited

U.S. PATENT DOCUMENTS

| | | |
|---|---|---|
| 2014/0086152 A1 | 3/2014 | Bontu et al. |
| 2017/0353819 A1 | 12/2017 | Yin et al. |

(Continued)

FOREIGN PATENT DOCUMENTS

| | | |
|---|---|---|
| CN | 104104485 A | 10/2014 |
| CN | 104823400 A | 8/2015 |

(Continued)

OTHER PUBLICATIONS

Fujitsu, "Considerations on HARQ-ACK feedback for NR-V2X unicast," 3GPP TSG RAN WG1 Meeting #95, R1-1812411, pp. 1-5, (Nov. 2, 2018).

(Continued)

*Primary Examiner* — Timothy J Weidner
(74) *Attorney, Agent, or Firm* — BROOKS KUSHMAN P.C.

(57) ABSTRACT

Embodiments of this disclosure provide a sidelink information transmission method, a terminal, and a control node. The method includes: determining a target resource based on a target resource configuration; and sending target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

15 Claims, 4 Drawing Sheets

Determine a target resource based on a target resource configuration — 201

Send target sidelink information on the target resource — 202

(51) Int. Cl.
  *H04W 28/06* (2009.01)
  *H04W 72/1263* (2023.01)
  *H04W 72/23* (2023.01)
  *H04W 72/25* (2023.01)
  *H04W 72/40* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)
  *H04W 92/18* (2009.01)

(52) U.S. Cl.
  CPC .......... *H04L 1/1887* (2013.01); *H04L 1/1893* (2013.01); *H04L 5/0037* (2013.01); *H04L 5/0055* (2013.01); *H04W 28/06* (2013.01); *H04W 72/1263* (2013.01); *H04W 72/23* (2023.01); *H04W 72/25* (2023.01); *H04W 72/40* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
  CPC ....... H04W 4/30–70; H04W 8/18–245; H04W 24/02–10; H04W 28/02–26; H04W 52/0209–0222; H04W 72/02–569; H04W 76/10–50; H04W 84/005–22; H04W 88/02–12; H04W 92/02–04; H04W 92/10–18
  See application file for complete search history.

(56) References Cited

U.S. PATENT DOCUMENTS

| | | |
|---|---|---|
| 2018/0279275 A1 | 9/2018 | Chen et al. |
| 2019/0053251 A1 | 2/2019 | Loehr et al. |
| 2019/0149279 A1 | 5/2019 | Lee et al. |
| 2020/0267597 A1* | 8/2020 | Huang .................. H04W 72/23 |
| 2020/0296796 A1 | 9/2020 | Uchiyama et al. |
| 2022/0103292 A1* | 3/2022 | Hwang .................. H04W 72/23 |
| 2022/0360374 A1* | 11/2022 | Yoshioka .............. H04W 72/23 |

FOREIGN PATENT DOCUMENTS

| | | |
|---|---|---|
| CN | 107592327 A | 1/2018 |
| CN | 109121209 A | 1/2019 |
| EP | 3 386 256 A1 | 10/2018 |
| JP | 2019-508931 A | 3/2019 |
| WO | 2018060972 A1 | 4/2018 |
| WO | 2018/160372 A1 | 9/2018 |
| WO | 2019/064983 A1 | 4/2019 |
| WO | 2019/073357 A1 | 4/2019 |

OTHER PUBLICATIONS

CN Office Action dated Mar. 11, 2021 as received in Application No. 201910673336.7.
Written Opinion of the International Searching Authority dated Feb. 3, 2022 as received in Application No. PCT/CN2020/102704.
IN Office Action dated Jun. 30, 2022 as received in Application No. 202227006952.
Extended European Search Report dated Jul. 20, 2022 as received in application No. 20845125.2.
"Discussion on HARQ feedback for NR V2X" 3GPP TSG RAN WG1 #96 R1-1902330, Feb. 25, 2019. CMCC.
JP Office Action dated Feb. 7, 2023 as received in Application No. 2022-504649.
First Office Action for Korean Application No. 10-2022-7003762, dated Mar. 18, 2024, 5 Pages.
Qualcomm Incorporated "Summary for Rel-15 DL/UL data scheduling and HARQ procedure" 3GPP TSG-RAN WG1 Meeting #94bis, Chengdu, China, Oct. 2018, R1-1811854, 39 Pages.

* cited by examiner

SIDELINK INFORMATION TRANSMISSION METHOD, TERMINAL, AND CONTROL NODE

CROSS-REFERENCE TO RELATED APPLICATIONS

This application is a continuation application of International Application No. PCT/CN2020/102704 filed on Jul. 17, 2020, which claims priority to Chinese Patent Application No. 201910673336.7 in China on Jul. 24, 2019, which is incorporated herein by reference in its entirety.

TECHNICAL FIELD

This disclosure relates to the field of communications technologies, and in particular, to a sidelink information transmission method, a terminal, and a control node.

BACKGROUND

In a new radio (NR) system, for transmission of a downlink data packet, the terminal may feed back, based on a reception and decoding status, hybrid automatic repeat request-acknowledgement (HARQ-ACK) information (which is a non-acknowledgement NACK or an acknowledgement ACK) through a physical uplink control channel (PUCCH) or physical uplink shared channel (PUSCH), so as to inform a control node whether transmission of the downlink data packet is successful, and to help the control node determine whether retransmission is required.

On sidelink, the terminal sends sidelink control information (SCI) through a physical sidelink control channel (PSCCH), and sends sidelink data by scheduling transmission of a physical sidelink shared channel (PSSCH). In order to improve reliability of data transmission and resource utilization on the sidelink, a HARQ feedback mechanism is also introduced to the NR sidelink technology: after receiving sidelink data, a sidelink receiving terminal may feed back sidelink HARQ-ACK information to indicate whether sidelink transmission is successful or fails. The HARQ response is transmitted through a physical sidelink feedback channel (PSFCH).

However, different from a HARQ feedback mechanism for downlink data packets over a Uu interface in NR, the sidelink transmission may be performed on the sidelink between terminals, but not being performed between the control node and the terminal. In this case, the control node cannot directly learn whether transmission of a sidelink data packet is successful, and the terminal needs to transmit sidelink HARQ-ACK information to the control node, so that the control node can further determine whether transmission on the sidelink is successful, and finally determine whether a sending terminal needs to be scheduled to perform retransmission on the sidelink.

At present, specific steps and details of how a sidelink terminal transmits sidelink information have not been discussed.

SUMMARY

Embodiments of this disclosure provide a sidelink information transmission method, a terminal, and a control node.

According to a first aspect, an embodiment of this disclosure provides a sidelink information transmission method, applied to a terminal and including:

determining a target resource based on a target resource configuration; and sending target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

According to a second aspect, an embodiment of this disclosure further provides a sidelink information transmission method, applied to a control node and including:

receiving target sidelink information transmitted by a terminal on a target resource, where the target sidelink information is first sidelink information corresponding to a first configured sidelink grant, or the target sidelink information is multiplexed information of the first sidelink information and first information; the first information is sidelink information corresponding to other scheduling than the first configured sidelink grant; and the target resource is at least one transmission resource configured in a target resource configuration.

According to a third aspect, an embodiment of this disclosure further provides a terminal, including:

a determining module, configured to determine a target resource based on a target resource configuration; and a transmitting module, configured to send target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

According to a fourth aspect, an embodiment of this disclosure further provides a control node, including:

a receiving module, configured to receive target sidelink information transmitted by a terminal on a target resource, where the target sidelink information is first sidelink information corresponding to a first configured sidelink grant, or the target sidelink information is multiplexed information of the first sidelink information and first information; the first information is sidelink information corresponding to other scheduling than the first configured sidelink grant; and the target resource is at least one transmission resource configured in a target resource configuration.

According to a fifth aspect, an embodiment of this disclosure further provides a terminal, including a memory, a processor, and a program stored in the memory and capable of running on the processor, where when the program is executed by the processor, the steps of the foregoing sidelink information transmission method are implemented.

According to a sixth aspect, an embodiment of this disclosure further provides a control node, including a memory, a processor, and a program stored in the memory and capable of running on the processor, where when the program is executed by the processor, the steps of the foregoing sidelink information transmission method are implemented.

According to a seventh aspect, an embodiment of this disclosure further provides a computer-readable storage medium, where a computer program is stored in the computer-readable storage medium. When the computer program is executed by a processor, the steps of the foregoing sidelink information transmission method are implemented.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

The following describes the embodiments of this disclosure with reference to the accompanying drawings. A sidelink information transmission method, a terminal, and a control node provided in the embodiments of this disclosure may be applied to a wireless communications system. The wireless communications system may be a 5G system, or an evolved long term evolution (eLTE) system, or a subsequent evolved communications system.

Figure 1A:
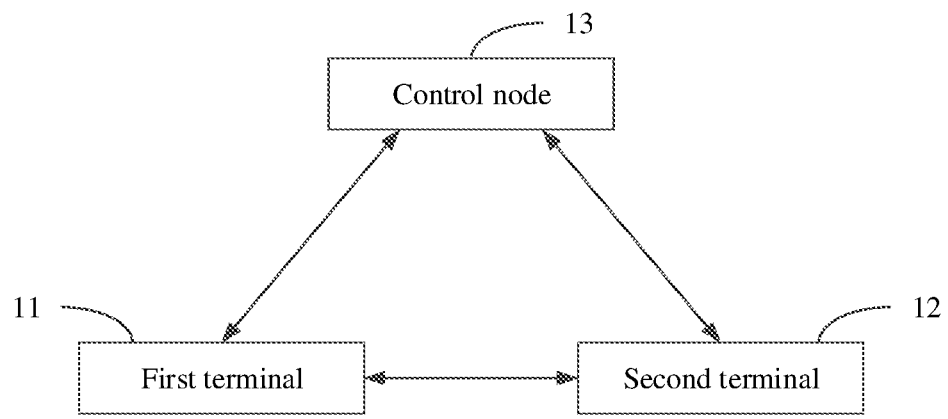
FIG. 1a is a structural diagram of a network system to which the embodiments of this disclosure are applicable.
Figure 1B:
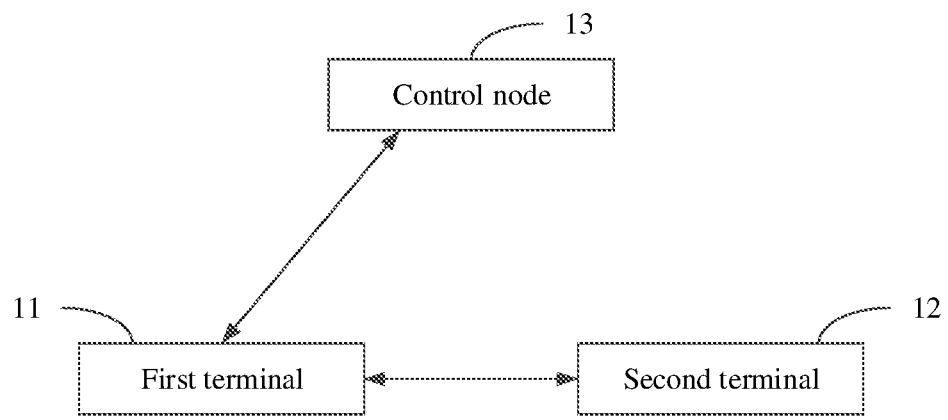
FIG. 1b is a structural diagram of another network system to which the embodiments of this disclosure are applicable.

FIG. 1a and FIG. 1b are structural diagrams of a network system to which the embodiments of this disclosure are applicable. As shown in FIG. 1a and FIG. 1b, the network system includes a first terminal 11, a second terminal 12, and a control node 13. The first terminal 11 and the second terminal 12 may be user terminals or other terminal-side devices, for example, a mobile phone, a tablet personal computer, a laptop computer, a personal digital assistant (PDA), a mobile Internet device (MID), or a wearable device. It should be noted that specific types of the first terminal 11 and the second terminal 12 are not limited in the embodiments of this disclosure. The control node 13 may be a network device or an intermediate terminal. The network device may be a 5G base station, or a base station of a later version, or a base station in another communications system, or is referred to as a NodeB, or an evolved NodeB, or a transmission and reception point (TRP), or an access point (AP), or other terms in the art. As long as a same technical effect is achieved, the network device is not limited to a specific technical term. In addition, the network device may be a master node (MN) or a secondary node (SN). It should be noted that the 5G base station is used merely as an example in this embodiment of this disclosure, rather than limiting a specific type of the network device.

Figure 2:
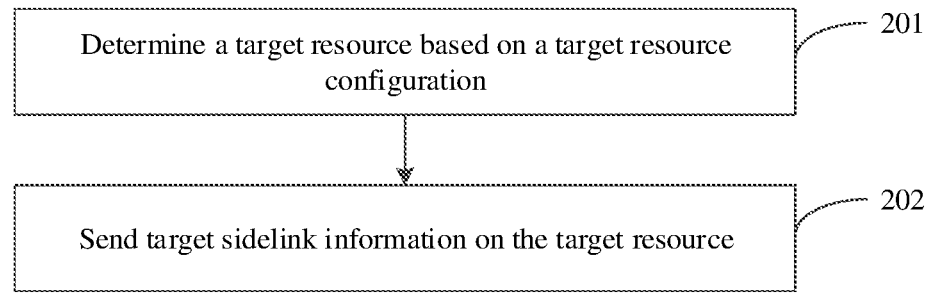
FIG. 2 is a first flowchart of a sidelink information transmission method according to an embodiment of this disclosure.

FIG. 2 is a flowchart of a sidelink information transmission method according to an embodiment of this disclosure. The method is applied to a terminal, and as shown in FIG. 2, includes the following steps.

Step 201: Determine a target resource based on a target resource configuration.

Step 202: Send target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

In this embodiment of this disclosure, the terminal is a terminal, but not a control node, in a sidelink transmission system, for example, may be a sending terminal that sends sidelink transmission, or a receiving terminal that receives sidelink transmission, or an intermediate terminal, where the intermediate terminal is an intermediate transmission node through which the sending terminal or the receiving terminal transmits data to the control node, and the intermediate transmission node does not include the sending terminal. In the following embodiments, terminals being the sending terminal of sidelink transmission and the receiving terminal of sidelink transmission are used as examples for description. In this case, a recipient of the target sidelink message may be the control node or the intermediate terminal. In the following embodiments, the recipient of the target sidelink information being the control node is used as an example for description.

Optionally, when the terminal is a sending terminal, the sending terminal may receive sidelink information through a PSFCH or PSSCH. When the terminal is a receiving terminal, sidelink information may be determined based on a receiving status of sidelink transmission. For ease of understanding, receiving sidelink information by the sending terminal and determining sidelink information by the receiving terminal are collectively referred to as obtaining sidelink information by the terminal.

The target resource configuration may be configured (or indicated) by the control node, defined by a protocol, preconfigured, negotiated between terminals, or indicated by other terminals. This is not further limited herein. The target resource configuration may be used for configuring a plurality of transmission resources. At least one transmission resource is configured based on the target resource configuration.

In this embodiment, after obtaining sidelink information, the terminal may map the sidelink information to the target notification information, and sends the target notification information to the control node by using the target resource. The sidelink information includes at least one of sidelink HARQ-ACK information, a sidelink scheduling request (SR), and channel state information (CSI) that are corresponding to one or more sidelink transmissions. The control node may support a sidelink link and/or a Uu link. After the terminal maps the sidelink information to the target notification information, if the target notification information is sent to the control node through the sidelink link, the control node may be referred to as a sidelink control node; or if the target notification information is sent to the control node through the Uu link, the control node may be referred to as a Uu control node. When the control node is a Uu control node, the target resource may be a PUCCH or PUSCH. When the control node is a sidelink control node, the target resource may be a PSFCH or PSSCH.

It should be noted that the first information may include at least one of the following: second sidelink information corresponding to at least one second configured sidelink grant and third sidelink information corresponding to dynamic scheduling. Dynamic scheduling usually refers to dynamic allocation of resources by using scheduling signaling, that is, each dynamically scheduled transmission has one piece of corresponding scheduling signaling. In this patent, scheduling signaling for scheduling sidelink transmission may be DCI or SCI, for example, when the control node works on sidelink, the terminal may be scheduled by using SCI to perform sidelink transmission. Sidelink transmission includes at least one of a control portion and a data portion. The third sidelink information is sidelink information corresponding to dynamically scheduled sidelink transmission. In this embodiment of this disclosure, understanding on the first sidelink information may be different.

In an optional embodiment, the first configured sidelink grant may be construed as all configured sidelink grants, and in this case, other scheduling is specifically dynamic scheduling.

In another optional embodiment, the first configured sidelink grant may be construed as all configured sidelink grants corresponding to type 1. Other scheduling includes sidelink grants of dynamic scheduling and type 2. In this case, the second configured sidelink grant in the first information is a sidelink grant corresponding to type 2. In other embodiments, the first configured sidelink grant may alternatively be the sidelink grant corresponding to type 2, and the second configured sidelink grant may be the sidelink grant corresponding to type 1

In another optional embodiment, the first configured sidelink grant may be construed as a specific configured sidelink grant, and other configured sidelink grants and dynamic scheduling are referred to as other scheduling.

In this embodiment of this disclosure, the target resource is determined based on the target resource configuration, and the first sidelink information or the multiplexed information of the first sidelink information and the first information are transmitted on the target resource, thereby clarifying a transmission mode for sidelink information and implementing transmission of sidelink information.

It should be noted that a HARQ codebook for the target sidelink information may be determined based on a sidelink transmission that has been actually performed by the terminal, or may be determined based on a sidelink transmission that may possibly occur (including that actually performed and that not actually performed). The following describes in detail a manner of determining a HARQ codebook separately in a case that the terminal has actually performed a sidelink transmission and in a case that the terminal does not actually perform a sidelink transmission.

For example, in an optional embodiment, in a case that no sidelink transmission is performed in K periods or K transmission occasions, the target sidelink information does not include a first hybrid automatic repeat request HARQ codebook or a HARQ codebook mapped by the first HARQ codebook, and the first HARQ codebook is a HARQ codebook corresponding to a configured sidelink grant; or in a case that no sidelink transmission is performed in K periods or K transmission occasions, the target sidelink information includes the first HARQ codebook or the HARQ codebook mapped by the first HARQ codebook, and all bits of the first HARQ codebook indicate a fixed state; where K is a positive integer.

It should be noted that in this embodiment, one grant may correspond to one target resource (for example, each configured sidelink grant may correspond to one first HARQ codebook), or a plurality of grants may correspond to one target resource. One transmission occasion in one grant may correspond to one target resource, or a plurality of transmission occasions in one grant may correspond to one target resource. A plurality of grants in one transmission occasion may correspond to one target resource, or a plurality of grants on a plurality of transmission occasions may correspond to one target resource. When a plurality of occasions (or a plurality of sidelink transmissions) are associated with one target resource, the terminal multiplexes sidelink information corresponding to all the occasions (or all the sidelink transmissions) and sends the sidelink information in a form of one codebook. For example, when a plurality of grants correspond to one target resource, the terminal multiplexes sidelink information corresponding to all the grants and sends the multiplexed sidelink information in a form of one codebook. Generally, bitmap information obtained through multiplexing sidelink information corresponding to a plurality of occasions or transmissions is referred to as a codebook. However, for convenience of description in this patent, regardless of whether multiplexing is performed, sidelink information that is multiplexed or not multiplexed is referred to as a codebook. For example, regardless of whether sidelink information is for different occasions, sidelink information is for different transmissions, or sidelink information is for different grants, all the sidelink information can be considered as different codebooks. In other words, the first HARQ codebook may alternatively be construed as HARQ-ACK information corresponding to one transmission, one occasion, or one grant, and may include HARQ-ACK information corresponding to one sidelink transmission, one occasion, or one grant; or may is construed as HARQ-ACK information corresponding to a plurality of transmissions, a plurality of occasions, or a plurality of grants, and may include HARQ-ACK information corresponding to a plurality of transmissions, a plurality of occasions, or a plurality of grants. The HARQ-ACK information corresponding to one sidelink transmission, one occasion, or one grant may include one or more bits.

That the target sidelink information includes the first HARQ codebook or the HARQ codebook mapped by the first HARQ codebook can be understood as: During transmission of the target sidelink information on the target resource, sidelink information determined or received by the terminal needs to be first mapped and then transmitted, and the target sidelink information includes the HARQ codebook mapped by the first HARQ codebook. When no mapping is required, the first HARQ codebook may be directly transmitted on the target resource, and in this case, the target sidelink information includes the first HARQ codebook. The fixed state may be specifically an acknowledgment ACK or a non-acknowledgement NACK, which is not further limited herein.

In this embodiment, the target sidelink information is sidelink information corresponding to sidelink transmission in K periods or K transmission occasions. Optionally, in an embodiment, the terminal does not actually send a sidelink transmission or receive a sidelink transmission in K periods or K transmission occasions, so that the terminal cannot obtain corresponding sidelink information. In this case, the first codebook is an empty set. Due to the empty set or no transmission being performed, the terminal does not send the first HARQ codebook (but may still send other information). In another embodiment, the receiving terminal sets corresponding sidelink information to a fixed state (for example, being all set to NACK, being all set to ACK, being set to a preset bit, or being set to a preset bit sequence) and sends the sidelink information to the sending terminal. In this case, the first HARQ codebook may be a non-empty set for the sending terminal but is derived based on the sidelink information fed back by the receiving terminal. However, the sending terminal knows that no transmission has been actually performed, and therefore the first HARQ codebook may not be sent (but other information may be still sent).

In another optional embodiment, the target sidelink information is sidelink information corresponding to sidelink transmission in K periods or K transmission occasions. Optionally, in an embodiment, the terminal does not actually send or receive a sidelink transmission in K periods or K transmission occasions, and the terminal sets bits, corresponding to such transmission, of the first HARQ codebook to a fixed state, for example, all being set to ACK. In this case, bits corresponding to occasions with no transmission actually performed in the first codebook are all set to ACK. Optionally, after receiving the first codebook, the control node does not schedule retransmission for these occasions.

In another optional embodiment, the target sidelink information is sidelink information corresponding to a sidelink transmission in K periods or K transmission occasions. Optionally, in an embodiment, the terminal has not actually sent or received a sidelink transmission in K periods or K transmission occasions. After determining the first codebook, the terminal performs mapping on the first codebook, and sends a mapped-to codebook to the control node. For example, bits, corresponding to such transmission, of the first HARQ codebook are set to a fixed state, optionally, being all set to ACK. An AND operation is performed on the bits, corresponding to such transmission, of the first HARQ codebook, and an obtained 1-bit result is the mapped-to codebook. In this case, the bit indicates ACK, and the bit is sent to the control node. Optionally, after the control node receives the mapped-to codebook, the control node does not schedule retransmission because the codebook indicates ACK.

In another embodiment, a reference time point may be set. If within a time window after the reference time point, no transmission is received, or no feedback information is received for a transmission being sent, all HARQ-ACK bits, corresponding to occasions in the window, of the codebook indicate NACK or indicate ACK.

In another optional embodiment, in a case that a sidelink transmission has been performed in K periods or K transmission occasions, the target sidelink information includes a second HARQ codebook or a HARQ codebook mapped by the second HARQ codebook, where the second HARQ codebook is a HARQ codebook corresponding to a configured sidelink grant, and K is a positive integer.

In this embodiment, a difference between the second HARQ codebook and the first HARQ codebook lies in that a transmission corresponding to the second HARQ codebook includes at least one actually-performed transmission, and further, may also include a transmission that may possibly occur but has not been actually performed. The transmission corresponding to the first HARQ codebook includes a transmission that may possibly occur but has not been actually performed.

Optionally, the number of bits of the second HARQ codebook is any one of the following:
 a first preset value;
 the number of first transmission units of an actually-performed sidelink transmission; and
 a smaller one of the number of first transmission units and a second preset value.

When the number of bits of the second HARQ codebook is the first preset value, it is equivalent to transmitting a HARQ codebook with fixed bits. The number of bits of the second HARQ codebook is the number of first transmission units in the actually-performed sidelink transmission, and the number of bits of the HARQ codebook is variable. When the number of bits of the second HARQ codebook is the smaller one of the number of first transmission units and the second preset value, the second preset value is used to limit a maximum value of the number of bits of the HARQ codebook to be transmitted.

The first preset value and the second preset value may be set based on actual requirements. In this embodiment, the first preset value and the second preset value may be configured (or indicated) by the control node, defined by a protocol, preconfigured, negotiated between terminals, or indicated by other terminals, which is not further limited herein. The first transmission unit may be a transport block (TB) or a code block group (CBG). One sidelink transmission includes one or more TBs. If a transmission is configured to be in a CBG form, one TB may include a plurality of CBGs. A value of K may be set based on actual requirements, and is not further limited herein.

In an optional embodiment, in a case that the number of bits of the second HARQ codebook is the first preset value, target confirmation information indicated by a bit, corresponding to a second transmission unit, in the second HARQ codebook is determined based on a reception and decoding status of the second transmission unit of the sidelink transmission. In this embodiment, there may be a case in which a redundant bit needs to be added. For example, when a transmission of 3 TBs has been actually performed and 4-bit HARQ-ACK needs to be fed back, 1-bit redundant information needs to be added.

The second transmission unit is one TB or a plurality of TBs, or may be one CBG or a plurality of CBGs. One sidelink transmission may correspond to one or more second transmission units. In this embodiment, each sidelink transmission corresponds to one second HARQ codebook, and each second transmission unit in the sidelink transmission corresponds to one bit of the second HARQ codebook. When the number of second transmission units in the actually-performed sidelink transmission is less than or greater than the second preset value, the terminal considers that the number of second transmission units in the actually-performed sidelink transmission is equal to the second preset value. In this case, the number of bits of the second HARQ codebook to be fed back is the second preset value.

In an optional embodiment, in a case that decoding of the second transmission unit fails, the target confirmation information is a first value; and/or in a case that reception of the second transmission unit fails, the target confirmation information is a second value; and/or in a case that decoding of the second transmission unit is successful, the target confirmation information is an acknowledgment.

States specifically indicated by the first value and the second value may be set based on actual requirements. For example, in this embodiment, the first value is a non-acknowledgment (for example, 0 may be used to indicate a non-acknowledgment, and in this case, the first value is 0). The second value is an acknowledgment (for example, 1 may be used to indicate an acknowledgment, and in this case, the second value is 1). Certainly, in other embodiments, the first value may be an acknowledgment, and the second value may be a non-acknowledgment. Alternatively, in other embodiments, the first value and the second value indicate a same state (NACK or ACK). It should be understood that the reception failure means that no corresponding second transmission unit is received, or control signaling, such as SCI, for transmission is not received.

It should be noted that during retransmission for a sidelink transmission of one configured sidelink grant, a method for determining a modulation and coding scheme (MCS) for retransmission by the terminal includes at least one of the following:
   an MCS used for retransmission is the same as an MCS indicated by scheduling signaling for activating the configured sidelink grant; further, optionally, the MCS used for the retransmission is the same as an MCS in most recently received activation signaling for activating the configured sidelink grant; or
   the MCS used for retransmission is the same as an MCS used for initial transmission of the sidelink transmission that is performed after the configured sidelink grant is activated; or
   the MCS used for retransmission is the same as an MCS used for a sidelink transmission of a redundancy version RV 0 that is performed after the configured sidelink grant is activated; further, optionally, the MCS used for retransmission is the same as an MCS used for a sidelink transmission that is closest to the retransmission of the RV 0 and that is performed after the configured sidelink grant is activated.

It should be noted that when a sidelink transmission for one configured sidelink grant is retransmitted, a behavior of determining a transport block size TBS for retransmission by the terminal includes at least one of the following:
   the TBS for retransmission is determined based on initial transmission of the sidelink transmission that is performed after the configured sidelink grant is activated, for example, the TBS for retransmission is the same as a TBS for initial transmission of the sidelink transmission that is performed after the configured sidelink grant is activated, or the TBS for retransmission is determined based on an MCS used during initial transmission of the sidelink transmission that is performed after the configured sidelink grant is activated; or
   the TBS for retransmission is determined based on a sidelink transmission of the RV 0 that is performed after the configured sidelink grant is activated, for example, the TBS for retransmission is the same as a TBS for initial transmission of the sidelink transmission of the RV 0 that is performed after the configured sidelink grant is activated, or the TBS for retransmission is determined based on an MCS used during initial transmission of the sidelink transmission of the RV 0 that is performed after the configured sidelink grant is activated; further, optionally, the TBS for retransmission is determined based on a sidelink transmission that is closest to the retransmission in the RV 0 and that is performed after the configured sidelink grant is activated, for example, the TBS for retransmission is the same as a TBS for initial transmission of the sidelink transmission that is closest to the retransmission in the RV 0 and that is performed after the configured sidelink grant is activated, or the TBS for retransmission is determined based on an MCS used during initial transmission of the sidelink transmission that is closest to the retransmission in the RV 0 and that is performed after the configured sidelink grant is activated; or
   the TBS for retransmission is determined based on scheduling signaling for activating the configured sidelink grant; further, optionally, the TBS for retransmission is determined based on most recently received activation signaling for activating the configured sidelink grant, for example, the TBS for retransmission is based on an MCS in the most recently received activation signaling for activating the configured sidelink grant (the TBS shall be determined from the most recent PDCCH scheduling the configured sidelink grant Type 2 PSSCH), or the TBS for retransmission is the same as a TBS for a sidelink transmission that is scheduled by the most recently received activation signaling for activating the configured sidelink grant.

Activation of the configured sidelink grant may be activation by using scheduling signaling, or may be validation of a configuration of the configured sidelink grant.

Further, a HARQ codebook in the target sidelink information is first HARQ-ACK information corresponding to a first sidelink transmission, or information mapped by the first HARQ-ACK information; where
   the first sidelink transmission is a sidelink transmission by the terminal.

In this embodiment, during sending of the sidelink information by the terminal, sidelink information corresponding to only a sidelink transmission of the terminal itself may be sent. In other words, the first sidelink transmission is a sidelink transmission that the terminal needs to send or receive. Specifically, the first sidelink transmission may include an actually-performed sidelink transmission and a non-actually-performed sidelink transmission.

Optionally, the first HARQ-ACK information is HARQ-ACK information obtained by the terminal.

Optionally, when there are a plurality of pieces of first HARQ-ACK information, the plurality of pieces of first HARQ-ACK information are concatenated.

Further, in a case that the terminal does not obtain the first HARQ-ACK information, the first HARQ-ACK information is determined according to at least one of the following:
   in a case that a feedback mechanism is mechanism 1, all bits of first HARQ-ACK information take a third value; and
   in a case that the feedback mechanism is mechanism 2, all bits of the first HARQ-ACK information take a fourth value.

States specifically indicated by the third value and the fourth value may be set based on actual requirements. For example, in this embodiment, the third value is a non-acknowledgment (for example, 0 may be used to indicate a non-acknowledgment, and the third value is 0 in this case). The fourth value is an acknowledgment (for example, 1 may be used to indicate an acknowledgment, and the fourth value is 1 in this case). Certainly, in other embodiments, the third value may be an acknowledgment, and the fourth value may be a non-acknowledgment. Alternatively, in other embodiments, the third value and the fourth value indicate the same state (NACK or ACK).

In addition, values of all bits in the first HARQ-ACK information may alternatively be determined based on a status of multicast and unicast, or be determined in combination with multicast, unicast, and the feedback mechanism. For example, in a case that the terminal does not obtain the first HARQ information, the first HARQ information is determined according to at least one of the following:

in a case that the first sidelink transmission is multicast and the feedback mechanism is mechanism 1, all the bits of the first HARQ information are an acknowledgment; and in a case that the first sidelink transmission is multicast and the feedback mechanism is mechanism 1, all the bits of the first HARQ information are a non-acknowledgment.

For another example, in a case that the terminal does not obtain the first HARQ information, the first HARQ information is determined according to at least one of the following:

in a case that the first sidelink transmission is multicast and the feedback mechanism is mechanism 2, or the first sidelink transmission is unicast, all the bits of the first HARQ information are an acknowledgment; and in a case that the first sidelink transmission is multicast and the feedback mechanism is mechanism 2, or the first sidelink transmission is unicast, all the bits of the first HARQ information are a non-acknowledgment.

Further, before the sending the target sidelink information on the target resource, the method further includes:

based on an occasion corresponding to a HARQ codebook for a configured sidelink grant, determining a HARQ codebook to be transmitted on the target resource.

It should be understood that the occasion may be defined based on actual requirements. In this embodiment, the occasion may include at least one of time domain and frequency domain.

In this embodiment, the occasion corresponding to the HARQ codebook for the configuration sidelink grant may be associated with at least one of the following: a service, a HARQ process, a carrier, a bandwidth part BWP, a resource pool, a subchannel, a sidelink information feedback resource, a terminal, a transmission type, a resource identifier, a resource scheduling type, a transmission mode, a delay, a ratio, the number of frequency division multiplexed FDM channels on the occasion, a feedback mechanism, a sidelink grant identifier, a sidelink grant type, a sidelink grant period, and a connection (connection or session). The feedback mechanism includes feedback mechanism 1 and feedback mechanism 2. An occasion of the feedback mechanism 2 (ACK/NACK feedback may take place according to this mechanism, and the mechanism 2 may alternatively be referred to as a connection mechanism or a connection-based mechanism, where this method is applicable to, but not limited to, a case that a connection is established between a receive end and a transmit end) is used to correspond to one subcodebook; and an occasion of the feedback mechanism 1 (only NACK feedback is performed, and the mechanism 1 may alternatively be referred to as a connection-less mechanism, where this method is applicable to, but not limited to, a case that no connection is established between the receive end and the transmit end) is used to correspond to another subcodebook. The mechanism 1 is for NACK-only feedback, that is, NACK is fed back if the data is received but cannot be decoded; or no feedback is provided in other cases. The mechanism 2 is for ACK/NACK feedback, that is, if the data is received but cannot be decoded, or SCI is received but the data is not received, NACK is fed back; or if the data is received and decoded correctly, ACK is fed back.

Optionally, occasions for different scheduling types (dynamic scheduling and semi-persistent scheduling) correspond to different positions in a traversal order. Traversal for dynamic scheduling is performed before that for semi-persistent scheduling.

Optionally, different resource identifiers (for example, configured sidelink grant id) correspond to different traversal sequences, and one configured sidelink grant may include a plurality of transmission occasions.

Optionally, occasions of different connections correspond to different positions in a traversal order. For example, occasions of all connections may be traversed sequentially based on connection IDs or a connection establishment order, for example, the connections are first traversed in an ascending order of IDs, and then occasions in each of the connections are traversed.

Optionally, occasions corresponding to different terminals correspond to different positions in a traversal order. For example, for sending terminals, occasions may be traversed in an order of different sending terminals, for example, being traversed in an ascending order of IDs of the sending terminals. More specifically, a sending terminal 1 sends two sidelink transmissions to the receiving terminal at moments t+1 and t+4, and the receiving terminal determines HARQ-ACK information for the two transmissions to be ACK and NACK, respectively. A sending terminal 2 sends one sidelink transmission to the receiving terminal at a moment t+3, and the receiving terminal determines HARQ-ACK information for the transmission to be ACK. During traversing, the receiving terminal first traverses two occasions (sidelink transmission occasions at the moments t+1 and t+4) corresponding to the sending terminal 1, and then traverses one occasion (a sidelink transmission occasion at the moment t+3) corresponding to the sending terminal 2. Further, optionally, HARQ-ACK bits, corresponding to the three occasions, in the codebook indicate ACK, NACK, and ACK, which are corresponding to the occasions at the moments t+1, t+4, and t+3, respectively. For example, for receiving terminals, occasions may be traversed in an order of different receiving terminals, for example, being traversed in an ascending order of IDs of the receiving terminals. More specifically, one sending terminal sends two sidelink transmissions to two receiving terminals. A receiving terminal 1 feeds back HARQ-ACK information, ACK and ACK, for the two transmissions at moments t+1 and t+4, respectively. A receiving terminal 2 feeds back HARQ-ACK information, NACK and NACK, for the two transmissions at moments t+2 and t+5, respectively. During traversing, the sending terminal first traverses two occasions (sidelink information occasions at the moments t+1 and t+4) corresponding to the receiving terminal 1, and then traverses two occasions (sidelink information occasions at the moments t+2 and t+5) corresponding to the receiving terminal 2. Further, optionally, HARQ-ACK bits, corresponding to the four occasions, in the codebook indicate ACK, ACK, NACK, and NACK, which are corresponding to the occasions at the moments t+1, t+4, t+2, and t+5, respectively.

In this embodiment, the terminal ID may be construed as any one of the following:
- an ID assigned by the control node to the terminal;
- a terminal ID predefined by the protocol;
- a terminal ID preconfigured by a manufacturer;
- an ID generated by the terminal based on higher-layer information (such as an ID at an application layer or IP layer or an ID at a medium access control (MAC) layer);
- an ID generated by the terminal based on a configuration by the control node, prescription in the protocol, or some preconfigured methods/rules; and
- a unique identifier associated with the terminal.

It should be noted that a HARQ-ACK codebook for the configured sidelink grant type 1 may correspond to an individual subcodebook or an individual codebook. For example, when there are a plurality of configured sidelink grants type 1, these configured sidelink grants type 1 correspond to an individual subcodebook or an individual codebook. Further, a HARQ-ACK codebook for the configured sidelink grant type 2 may correspond to an individual subcodebook or an individual codebook. For example, when there are a plurality of configured sidelink grants type 2, these configured sidelink grants type 2 correspond to an individual subcodebook or an individual codebook.

Optionally, in an embodiment, configured sidelink grants with different IDs may each correspond to an individual subcodebook or an individual codebook.

Optionally, occasions corresponding to different connections correspond to different positions in a traversal order, and the connection may include at least one of a connection type, the number of connections, and a connection identifier.

Optionally, a HARQ codebook for each configured sidelink grant corresponds to one occasion. Specifically, the occasion corresponding to the HARQ codebook may be construed as:
- an occasion for scheduling signaling used for activating the configured sidelink grant type 2;
- an occasion for scheduling signaling used for deactivating the configured sidelink grant type 2;
- that every K transmission occasions for a sidelink transmission for the configured sidelink grant is the occasion corresponding to the codebook;
- that every K periods of a sidelink transmission for the configured sidelink grant is the occasion corresponding to the codebook;
- that K occasions for sidelink information corresponding to a sidelink transmission for the configured sidelink grant are the occasion corresponding to the codebook; (the occasions for the sidelink information is an occasion for a resource used for feeding back sidelink information to the sending terminal by the receiving terminal, such as an occasion for the PSFCH); and
- that K subchannels are the occasion corresponding to the codebook.

It should be noted that such occasions may be candidate occasions or actual occasions. For example, the occasion for a sidelink transmission of a configured sidelink grant is a candidate occasion where sidelink transmission may be performed for the configured sidelink grant, that is, a transmission occasion. In this case, the K transmission occasions correspond to occasions of one codebook.

Optionally, the occasion corresponding to the HARQ codebook for the configured sidelink grant includes at least one of the following: occasions corresponding to HARQ codebooks for configured sidelink grants on different sidelink carriers;
- occasions corresponding to HARQ codebooks for configured sidelink grants used for different services
- occasions corresponding to HARQ codebooks for configured sidelink grants using different HARQ processes;
- occasions corresponding to HARQ codebooks for configured sidelink grants on different BWPs;
- occasions corresponding to HARQ codebooks for configured sidelink grants on different resource pools;
- occasions corresponding to HARQ codebooks for configured sidelink grants on different subchannels;
- occasions corresponding to HARQ codebooks for configured sidelink grants corresponding to different sidelink information feedback resources;
- occasions corresponding to HARQ codebooks for configured sidelink grants for different terminals;
- occasions corresponding to HARQ codebooks for configured sidelink grants using different transmission types;
- occasions corresponding to HARQ codebooks for configured sidelink grants corresponding to different resource identifiers;
- occasions corresponding to HARQ codebooks for configured sidelink grants using different resource scheduling types;
- occasions corresponding to HARQ codebooks for configured sidelink grants using different transmission modes;
- occasions corresponding to HARQ codebooks for configured sidelink grants corresponding to different delays;
- occasions corresponding to HARQ codebooks for configured sidelink grants corresponding to different ratios;
- occasions corresponding to HARQ codebooks for configured sidelink grants corresponding to different periods;
- occasions corresponding to HARQ codebooks for configured sidelink grants corresponding to different frequency division multiplexing FDM identifiers;
- occasions corresponding to HARQ codebooks for configured sidelink grants using different feedback mechanisms;
- occasions corresponding to HARQ codebooks for configured sidelink grants corresponding to different configured sidelink grant identifiers;
- occasions corresponding to HARQ codebooks for configured sidelink grants corresponding to different configured sidelink grant types; and
- occasions corresponding to HARQ codebooks for configured sidelink grants corresponding to different connections.

The sidelink information feedback resource is a resource used for obtaining sidelink information, and may be a PSFCH or PSSCH. For example, the sending terminal may obtain, from the PSFCH or PSSCH, sidelink information sent by the receiving terminal.

Further, confirmation information indicated by each bit of a HARQ codebook transmitted on the target resource corresponds to HARQ-ACK information at the occasion corresponding to the HARQ codebook for the configured sidelink grant.

In this embodiment, confirmation information indicated by each bit includes one of two states: NACK and ACK. Bits of the HARQ codebook transmitted on the target resource may be obtained through one-to-one mapping, compression, or extension on bits of the HARQ codebook for the configured sidelink grant. Optionally, when one-to-one mapping is used, confirmation information indicated by each bit of the HARQ codebook transmitted on the target resource is the same as confirmation information (which is NACK or ACK) indicated by HARQ-ACK information in a corresponding occasion of the HARQ codebook for the configured sidelink grant. Optionally, extension includes at least one of bit padding and repetition.

Optionally, the HARQ codebook transmitted on the target resource satisfies at least one of the following conditions:
for one first target configured sidelink grant, an index of a HARQ-ACK bit, corresponding to the first target configured sidelink grant, in the codebook is the same as an index of a first target bit in the codebook, where the first target bit is a HARQ-ACK bit corresponding to the first target configured sidelink grant and to be fed back for the first time after configuration of the first target configured sidelink grant takes effect;
for one second target configured sidelink grant, an index of a HARQ-ACK bit, corresponding to the second target configured sidelink grant, in the codebook is the same as an index of a second target bit in the codebook, where the second target bit is a HARQ-ACK bit corresponding to scheduling signalling for activating the second target configured sidelink grant;
for one second target configured sidelink grant, an index of a HARQ-ACK bit, corresponding to the second target configured sidelink grant, in the codebook is the same as an index of a third target bit in the codebook, where the third target bit is a HARQ-ACK bit corresponding to the second target configured sidelink grant and to be fed back for the first time after the second target configured sidelink grant is activated; and
for one second target configured sidelink grant, an index of a HARQ-ACK bit, corresponding to scheduling signaling for deactivating the second target configured sidelink grant, in the codebook is the same as the index of the second target bit in the codebook.

The index of the HARQ-ACK bit, corresponding to the first target configured sidelink grant, in the codebook is an index (which is an index or sequence in a bitmap) of a HARQ-ACK bit, corresponding to a first occasion for the first target configured sidelink grant, in the codebook. The index of the HARQ-ACK bit, corresponding to the second target configured sidelink grant, in the codebook is an index (which is an index or sequence in a bitmap) of a HARQ-ACK bit, corresponding to a second occasion for the second target configured sidelink grant, in the codebook.

The first occasion is an occasion corresponding to the codebook. For example, the first occasion may be one or more transmission occasions for the first target configured sidelink grant, or may be occasions for one or more sidelink transmissions of the first target configured sidelink grant, or may be an occasion for sidelink information corresponding to one or more sidelink transmissions of the first target configured sidelink grant.

The second occasion is an occasion corresponding to the codebook. For example, the second occasion may be one or more transmission occasions for the second target configured sidelink grant, or may be occasions for one or more sidelink transmissions of the second target configured sidelink grant, or may be an occasion for sidelink information corresponding to one or more sidelink transmissions of the second target configured sidelink grant.

For example, after the configuration of the first target configured sidelink grant takes effect, at a time t0, one sidelink transmission occurs for the first target configured sidelink grant, and a HARQ-ACK bit corresponding to the transmission is the first bit of a codebook corresponding to the transmission. At times t0+5 and t0+12, two sidelink transmissions occur for the first target configured sidelink grant. The two sidelink transmissions may be considered as two first occasions, and HARQ-ACK bits corresponding to the two first occasions are the first bits of codebooks corresponding to the two transmissions, respectively.

For example, after the configuration of the second target configured sidelink grant takes effect, the configuration of the second target configured sidelink grant is activated by using scheduling signaling of the time t0, and a HARQ-ACK bit corresponding to the scheduling signaling is the first bit of a corresponding codebook. The second target configured sidelink grant is deactivated by scheduling signaling of the time t+20. The scheduling signaling may be considered as one second occasion, and a HARQ-ACK bit corresponding to this occasion is also the first bit of a codebook in which the second occasion is located.

A type of the first target configured sidelink grant is configured sidelink grant type 1, and a type of the second target configured sidelink grant is configured sidelink grant type 2.

Further, the target resource includes a transmission resource selected based on a data volume of the target sidelink information.

In this embodiment, a data volume transmittable by the target resource is greater than or equal to a first data volume.

The first data volume is the data volume of the target sidelink information.

Optionally, in order to avoid resource waste, the target resource is a transmission resource, with a smallest difference between the transmittable data volume and the first data volume, in a first transmission resource corresponding to the first configured sidelink grant.

For example, a data volume transmittable by the first transmission resource includes 1 bit, 2 bits, 4 bits, and 5 bits. If the first data volume is 3 bits, a first transmission resource of 4 bits is used as the target resource.

Optionally, a corresponding transmission resource may alternatively be selected as the target resource based on a resource type. For example, in a case that the target sidelink information is the multiplexed information, the target resource is any one of the following:
in a case that the first information includes second sidelink information corresponding to at least one second configured sidelink grant, but does not include third sidelink information corresponding to dynamic scheduling, the target resource is a transmission resource corresponding to the first configured sidelink grant or a transmission resource corresponding to the second configured sidelink grant;
in a case that the first information includes the third sidelink information, but does not include the second sidelink information, the target resource is a transmission resource corresponding to the first configured sidelink grant or a transmission resource corresponding to dynamical scheduling; and
in a case that the first information includes both the second sidelink information and the third sidelink information, the target resource is a transmission resource corresponding to a configured sidelink grant or a transmission resource corresponding to dynamical scheduling.

In this embodiment, the selected target resource can also satisfy a data volume requirement. That is, the data volume transmittable by the target resource is greater than or equal to a second data volume, where the second data volume is a data volume of the multiplexed information. Further, the target resource is a transmission resource, with a smallest difference between the transmittable data volume and the second data volume, in a first transmission resource corresponding to the first configured sidelink grant.

It should be noted that a condition for multiplexing the first sidelink information and the first information may be set based on actual requirements. For example, in an optional embodiment, in a case that a first resource corresponding to the first sidelink information and a second resource corresponding to the first information meet a preset condition, the target sidelink information is the multiplexed information, and the preset condition includes at least one of the following:

the first resource partially or completely overlaps the second resource;
the first resource and the second resource are located in a same target range, and the target range includes at least one of a time domain range and a frequency domain range;
a sum of a total resource quantity of the first resource and a total resource quantity of the second resource is greater than a third preset value;
the total resource quantity of the first resource is greater than a fourth preset value;
the total resource quantity of the second resource is greater than the fourth preset value; and
the first resource and the second resource are both long format resources.

The same time domain range may refer to a same time slot, subslot, time window, timer, or the like. For example, the second resource does not exist in a slot in which the first resource is located, or the second resource does not exist within a time window starting from a time domain position of the first resource, or the second resource does not exist before a timer starting with the first resource as a reference point expires. The same frequency domain range may refer to a same bandwidth (for example, 20 RB), a same bandwidth part (BWP), a same carrier, a same resource pool, or a same subchannel. The third preset value and the fourth preset value may be set based on actual requirements. In this embodiment, the third preset value is greater than the fourth preset value. It should be noted that the preset condition may include one or more of the foregoing conditions. When a plurality of conditions are included, it can be understood that all the conditions are satisfied simultaneously, and it is determined that the first sidelink information is multiplexed with the first information. The target sidelink information transmitted on the resource is the multiplexed information For better understanding of this disclosure, the sidelink terminal (hereinafter referred to as the terminal) sending the sidelink information (using the sidelink HARQ-ACK information as an example) to the control node is used as an example to describe in detail an implementation process of this disclosure.

The terminal may include a sending terminal (a terminal that sends a sidelink transmission) and a receiving terminal (a terminal that receives a sidelink transmission). The control node may support a sidelink link and/or Uu link. The terminal maps the sidelink information to the target notification information, and if the target notification information is sent to the control node through the sidelink link, the control node may be referred to as a sidelink control node, and the target notification information may be construed as sidelink HARQ-ACK information; or if the target notification information is sent to the control node through the Uu link, the control node may be referred to as a Uu control node, and the target notification information may be construed as Uu HARQ-ACK information. Certainly, the sidelink HARQ-ACK information and Uu HARQ-ACK information are merely used to distinguish HARQ-ACK information transmitted by the terminal through different links, but not used to limit transmission content. It is also possible that the sidelink HARQ-ACK information and Uu HARQ-ACK information are collectively referred to as HARQ-ACK information.

When the control node is a 4G base station or an LTE base station, the control node may schedule an NR sidelink or an LTE sidelink. When the control node schedules an NR sidelink, the target resource for codebook transmission is an LTE PUCCH or PUSCH resource. When the control node is a 4G base station or an LTE base station and schedules an NR sidelink, the configured sidelink grant type 1 may be configured for an LTE sidelink terminal.

When the control node is a 5G base station or a base station of a later version, the control node can schedule an NR sidelink or an LTE sidelink. When the control node is a 5G base station or a base station of a later version and schedules an LTE sidelink, the configured sidelink grant type 2 can be configured for an LTE sidelink terminal and is activated or deactivated by using DCI. During scheduling of the NR sidelink, the configured sidelink grant type 1 and/or configured sidelink grant type 2 may be configured for the NR sidelink terminal.

It should be understood that a case in which the terminal obtains sidelink information includes:

Case 1: The sending terminal sends a sidelink transmission, the receiving terminal receives the sidelink transmission and determines corresponding sidelink HARQ-ACK information, the receiving terminal feeds back the sidelink HARQ-ACK information to the sending terminal through a PSFCH or PSSCH, and the sending terminal receives sidelink HARQ-ACK information corresponding to at least one sidelink transmission or receives sidelink HARQ-ACK information from at least one receiving terminal. Such information is sidelink information. In this case, the sending terminal performs reporting to the control node.

Case 2: The receiving terminal receives at least one sidelink transmission and determines corresponding sidelink HARQ-ACK information. Such information is sidelink information, and is reported to the control node by the receiving terminal.

The sending terminal or the receiving terminal maps the sidelink information to the target notification information. When the control node is a Uu control node, the mapped-to information is reported to the control node, such as a base station, through the target resource (uplink resource). When the control node is a sidelink control node, the mapped-to information is reported to the sidelink control node through the target resource (sidelink resource).

The sending terminal and the receiving terminal are collectively referred to as a terminal below, and the process of sending the sidelink information by the terminal is described in detail.

1. Multiplexing of Sidelink Information:

The terminal obtains the target resource configuration, and determines the target resource based on the target resource configuration. The target resource configuration may be configured (or indicated) by the control node, defined by a protocol, preconfigured, negotiated between terminals, or indicated by other terminals.

Scheme 1. At least one target resource set or target resource for sending may be selected based on a bit size or a bit size range of information to be transmitted.

For a configured sidelink grant, at least one target resource set or target resource for sending is selected based on a bit size or bit size range of sidelink information (such as HARQ-ACK information) corresponding to a sidelink transmission for the configured sidelink grant; and when the sidelink information for the configured sidelink grant is multiplexed with sidelink information corresponding to other scheduling, at least one target resource set or target resource is selected based on a bit size or bit size range of the multiplexed information to send the multiplexed information.

In an embodiment, if two target resource sets are configured for one configured sidelink grant, the number of bits of information that can be carried by all resources in a set 1 falls within a range 1, and the number of bits of information that can be carried by all resources in a set 2 falls within a range 2.

When needing to feed back sidelink information for a sidelink transmission of a configured sidelink grant, the terminal selects a corresponding set based on a size of the sidelink information. For example, the number of bits of the sidelink information that the terminal needs to feed back for the sidelink transmission for the configured sidelink grant falls within the range 1, and then the set 1 is selected for sending. Further, if the sidelink information is multiplexed with sidelink information for sidelink transmission of other scheduling (such as dynamic scheduling or another configured sidelink grant), one of the set 1 and the set 2 is selected based on the number of bits of sidelink information obtained through multiplexing. For example, after the number of bits of the sidelink information obtained through multiplexing falls with the range 2, the set 2 is selected for sending.

In another embodiment, if two resources are configured for one configured sidelink grant, the number of bits of information that can be carried by a resource 1 falls within a range 1, and the number of bits of information that can be carried by a resource 2 falls within a range 2.

When needing to feed back sidelink information for a sidelink transmission of a configured sidelink grant, the terminal selects a corresponding set based on a size of the sidelink information. For example, the number of bits of the sidelink information that the terminal needs to feed back for the sidelink transmission for the configured sidelink grant falls within the range 1, and then the resource 1 is selected for sending. Further, if the sidelink information is multiplexed with sidelink information for sidelink transmission of other dynamic scheduling, one of the resource 1 and the resource 2 is selected based on the number of bits of sidelink information obtained through multiplexing. For example, after the number of bits of the sidelink information obtained through multiplexing falls with the range 2, the resource 2 is selected for sending.

For the configured sidelink grant, if the first resource corresponding to the configured sidelink grant and the second resource corresponding to other scheduling (another configured sidelink grant and/or dynamic scheduling) meet a preset condition, the terminal multiplexes the sidelink information corresponding to the configured sidelink grant and the sidelink information corresponding to other scheduling, and then sends the multiplexed information. The preset condition may include at least one of the following:
the first resource partially or completely overlaps the second resource;
the first resource and the second resource are located in a same target range, and the target range includes at least one of a time domain range and a frequency domain range;
a sum of a total resource quantity of the first resource and a total resource quantity of the second resource is greater than a third preset value;
the total resource quantity of the first resource is greater than a fourth preset value;
the total resource quantity of the second resource is greater than the fourth preset value; and
the first resource and the second resource are both long format resources.

For example, when the first resource and the second resource are located in a same slot and the total quantity exceeds 2, the sidelink information for the configured sidelink grant needs to be multiplexed with the sidelink information corresponding to other scheduling.

Optionally, when the first resource and the second resource are located in the same slot, and the sidelink information for the configured sidelink grant and the sidelink information corresponding to other scheduling both include HARQ-ACK, the sidelink information for the configured sidelink grant needs to be multiplexed with the sidelink information corresponding to other scheduling.

Scheme 2: In a case of transmission based on multiplexing, a corresponding target resource may alternatively be determined by selecting the target resource based on a resource type.

In an optional embodiment, when the target resource corresponding to the configured sidelink grant and the target resource corresponding to the dynamic scheduling meet the preset condition, the terminal multiplexes the sidelink information corresponding to the configured sidelink grant and sidelink information corresponding to dynamic scheduling, and sends the multiplexed information on the target resource corresponding to the configured sidelink grant. Alternatively, the terminal multiplexes the sidelink information corresponding to the configured sidelink grant and the sidelink information corresponding to the dynamic scheduling, and sends the multiplexed information on the target resource corresponding to the dynamic scheduling.

In another optional embodiment, when target resources corresponding to at least two configured sidelink grants meet the preset condition, the terminal multiplexes sidelink information corresponding to the configured sidelink grants, and sends the multiplexed information on a target resource corresponding to one of the configured sidelink grants.

For example, when target resources corresponding to at least two configured sidelink grants meet the preset condition, the terminal multiplexes sidelink information corresponding to these configured sidelink grants in this case, and sends the multiplexed information on a target resource corresponding to one of these configured sidelink grants.

Optionally, one of these configured sidelink grants is a configured sidelink grant with a smallest ID in these configured sidelink grants.

Optionally, one of these configured sidelink grants is a configured sidelink grant with a largest ID in the configured sidelink grants.

Optionally, one of these configured sidelink grants is a configured sidelink grant with a latest transmission occasion in the configured sidelink grants.

Optionally, one of these configured sidelink grants is a configured sidelink grant with a smallest period in these configured sidelink grants.

Optionally, one of these configured sidelink grants is a configured sidelink grant with a largest period in these configured sidelink grants.

Optionally, one of these configured sidelink grants is a configured sidelink grant whose corresponding sidelink information feedback resource has a smallest period in these configured sidelink grants, specifically, a configured sidelink grant whose corresponding PSFCH has a smallest period in these configured sidelink grants.

Optionally, one of these configured sidelink grants is a configured sidelink grant whose corresponding sidelink information feedback resource has a highest density in these configured sidelink grants, specifically, a configured sidelink grant whose corresponding PSFCH has a highest time domain density in these configured sidelink grants, or specifically a configured sidelink grant whose corresponding PSFCH has a largest frequency domain FDM quantity in these configured sidelink grants.

Optionally, one of these configured sidelink grants is a configured sidelink grant whose corresponding sidelink information feedback resource has a largest period in these configured sidelink grants, specifically, a configured sidelink grant whose corresponding PSFCH has a largest period in these configured sidelink grants.

Optionally, one of these configured sidelink grants is a configured sidelink grant whose corresponding sidelink information feedback resource has a lowest density in these configured sidelink grants, specifically, a configured sidelink grant whose corresponding PSFCH has a lowest time domain density in these configured sidelink grants, or specifically a configured sidelink grant whose corresponding PSFCH has a lowest frequency domain FDM quantity in these configured sidelink grants.

It should be understood that the foregoing scheme 2 and scheme 1 can be used in combination, that is, a target resource selected in scheme 2 meets a quantity requirement in scheme 1.

It should be noted that for one period P, configured sidelink grants corresponding to M transmission occasions (transmission occasion) are included in each period P. For sidelink transmission (the sidelink transmission includes at least one of an actually-performed transmission and a non-actually-performed transmission, and the transmission is sending or receiving) in transmission occasions of K periods or K transmission occasions (K is a positive integer), the terminal performs one of the following behaviors:

The terminal transmits a fixed quantity of TBs on these occasions, that is, transmitting N_TB TBs, where, for example, N_TB is 1, that is, transmitting a same TB. For example, different RV versions of the same TB are transmitted, or the same TB is repeatedly (repetition) transmitted.

The number of TBs that the terminal can transmit on these occasions does not exceed N_TB_MAX.

2. Determining a HARQ Codebook for a Configured Sidelink Grant 2.1 For an actually-performed sidelink transmission, determining bits to be fed back Using sidelink transmission on transmission occasions of K periods as an example:

1. For a configured sidelink grant with M transmission occasions included in one period, the following cases may occur for all transmission occasions in the K periods:

All transmission occasions in the K periods are used for transmitting N_TB TBs, for example, N_TB=1, that is, transmitting a same TB. For example, K=1, that is, only one TB can be transmitted on the transmission occasions in one period.

Alternatively, all transmission occasions in K periods are used for transmission of a maximum of N_TB_MAX TBs (actually transmitted TBs may be less than or equal to N_TB_MAX). For example, K=1, and N_TB_MAX=2, that is, the transmission occasions in one period can be used for transmitting a maximum of 2 TBs, and specifically, whether to be used for transmitting 1 or 2 TBs depends on the sending terminal.

Alternatively, there is no limitation on the number of TBs.

Optionally, for the receiving terminal, if the terminal receives sidelink transmission on at least one transmission occasion in K periods, the terminal may determine HARQ-ACK information corresponding to the K periods based on a reception and decoding status.

Manner 1: If all transmission occasions in the K periods are used for transmitting N_TB TBs, for example, N_TB=1, that is, transmitting a same TB, in this case, based on the reception and decoding status, the HARQ-ACK information corresponding to the K periods is ACK/NACK of N_TB bits. (a) For example, when N_TB=1, successful decoding corresponds to 1-bit ACK; otherwise, successful decoding corresponds to 1-bit NACK.

Manner 2: If all the transmission occasions in the K periods are used for transmitting a maximum of N_TB_MAX TBs, the HARQ-ACK information corresponding to the K periods is ACK/NACK of N_TB_MAX bits, in this case, the maximum number of bits N_TB_MAX bits or the number of actually received TBs N_actual can be fed back.

When N_TB_MAX bits are fed back, HARQ-ACK corresponding to each of received N_actual TBs is determined based on a receiving and decoding status of the TB, so as to determine HARQ-ACK of N_TB_MAX bits; and those for non-received TBs all correspond to a fixed state, such as ACK, so as to determine N_TB_MAX−N_actual ACKs, and to finally determine HARQ-ACK information of N_TB_MAX bits. For example, N_TB_MAX=4, but only 3 TBs are received and decoding of all the 3 TBs fails. In this case, the HARQ-ACK information corresponding to the K periods is 3-bit NACK and 1-bit ACK.

Alternatively, when N_TB_MAX bits are fed back, HARQ-ACK corresponding to each of received N_actual TBs is determined based on a receiving and decoding status of the TB, so as to determine HARQ-ACK of N_TB_MAX bits; and those for non-received TBs all correspond to a fixed state, such as NACK, so as to determine N_TB_MAX−N_actual NACKs, and to finally determine HARQ-ACK information of N_TB_MAX bits. For example, N_TB_MAX=4, but only 3 TBs are received and decoding of all the 3 TBs fails. In this case, the HARQ-ACK information corresponding to the K periods is 4-bit NACK.

When N_actual bits are fed back, HARQ-ACK corresponding to each of received N_actual TBs is determined based on a receiving and decoding status of the TB, and HARQ-ACK information of N_actual bits is fed back. For example, N_TB_MAX=4, but only N_actual=3 TBs are received, corresponding to NACK, NACK, and ACK. In this case, the HARQ-ACK information corresponding to the K periods is 3 bits, corresponding to NACK, NACK, and ACK.

Manner 3: there is no limitation on the number of TBs.

Feeding back N_actual bits: ACK/NACK corresponding to each of received N_actual TBs is determined based on a receiving and decoding status of the TB, and HARQ-ACK information of N_actual bits is fed back. For example, only N_actual=3 TBs are received, corresponding to NACK, NACK, and ACK. In this case, the HARQ-ACK information corresponding to the K periods is 3 bits, corresponding to NACK, NACK, and ACK.

Manner 4: If each transmission occasion in the K periods corresponds to one HARQ-ACK bit, a corresponding bit is set to ACK if a transmission is received on this occasion and decoding is successful, and a corresponding bit is set to NACK if a transmission is received butt decoding fails. A corresponding bit is set to ACK if a transmission is not received, or a corresponding bit is set to NACK if a transmission is not received.

In a case of sidelink transmission in K transmission occasions, determining a HARQ codebook for the configured sidelink grant is similar to that in the foregoing case with K periods, and details are not repeated herein.

Further, the terminal may also perform the following behaviors:

The terminal sends HARQ-ACK information to the control node on a corresponding first target resource; and/or the terminal sends HARQ-ACK information to the sending terminal on a corresponding second target resource.

Optionally, for the sending terminal, the terminal performs (one or more) sidelink transmission on at least one transmission occasion in K' periods, and in this case, the behavior includes one of the following:

In an embodiment, if the terminal receives at least one piece of HARQ-ACK information on the second target resource, the terminal further determines, based on the received HARQ-ACK information, HARQ-ACK bit(s) for sidelink transmission sent by the terminal itself, and sends sidelink information on a corresponding target resource.

For example, the HARQ-ACK bit(s), for the sidelink transmission sent by the terminal itself, in the sidelink information is equal to the HARQ-ACK information received on the second target resource. Assuming that ACK is received, the HARQ-ACK bit is set to ACK; assuming that NACK is received, the HARQ-ACK bit is set to NACK; assuming that a HARQ-ACK bitmap is received, a value of a HARQ-ACK bit corresponding to the sidelink transmission in the sidelink information are set to the bitmap. Further, if a plurality of pieces of HARQ-ACK information are received, the plurality of pieces of HARQ-ACK information are concatenated, and the HARQ-ACK bit(s), for the sidelink transmission sent by the terminal itself, in the sidelink information is equal to the concatenated bitmap.

In another embodiment, an AND operation or an BITAND operation may be performed on all bits of the HARQ-ACK information received on the second target resource, and the HARQ-ACK bit, for the sidelink transmission sent by the terminal itself, in the sidelink information is equal to a result of the AND operation or BITAND operation. For example, K=K'=1, the terminal sends N_TB_MAX=4 TBs in one period, and the receiving terminal feeds back 4 bits. HARQ-ACK information for the 4 TBs is received and corresponds to ACK, NACK, NACK, and NACK, respectively. An AND operation is performed on the HARQ-ACK information to obtain 1-bit NACK, and a HARQ-ACK bit corresponding to the sidelink transmission in the sidelink information is equal to NACK.

In another embodiment, if the terminal receives no HARQ-ACK information on the second resource, sidelink information may be determined according to a feedback mechanism. For example:

if a sidelink transmission that is sent is multicast and the feedback mechanism is mechanism 1, the terminal sets all the HARQ-ACK bit(s), for the sidelink transmission sent by the terminal itself, in the sidelink information to ACK, and sends the sidelink information on the corresponding target resource; or if a sidelink transmission that is sent is multicast and the feedback mechanism is mechanism 2, or if the sidelink transmission that is sent is unicast, the terminal sets all the HARQ-ACK bit(s), for the sidelink transmission sent by the terminal itself, in the sidelink information to NACK, and sends the sidelink information on the corresponding target resource.

In another embodiment, if the terminal receives no HARQ-ACK information on the second target resource, the terminal does not send the sidelink information for the sidelink transmission sent by the terminal itself.

2.2 For non-actually-performed sidelink transmission, determining bits to be fed back If the terminal sends no sidelink transmission or receives no sidelink transmission on all transmission occasions in K' periods, in one embodiment, the terminal does not send HARQ-ACK information for the K' periods of the configured sidelink grant (but may send information for other scheduling) on the corresponding target resource. Optionally, K'=1. In another embodiment, the terminal sets all HARQ-ACK bit(s) corresponding to the K' periods of the configured sidelink grant to ACK, and sends the sidelink information on the corresponding target resource.

Specifically, a semi-persistent codebook or a dynamic codebook may be used for feedback.

Optionally, if the configured sidelink grant uses a semi-persistent codebook to send the sidelink information to the control node, a period of the target resource corresponding to the configured sidelink grant is equal to $\beta$*configured sidelink grant periods (that is, there is a corresponding target resource for every $\beta$ periods P, and the sidelink information in these $\beta$ periods is sent to the control node every $\beta$ periods).

Optionally, if the terminal receives no sidelink transmission on all transmission occasions in K' periods for one configured sidelink grant, all HARQ-ACK bit(s) corresponding to the K' periods of the configured sidelink grant may be set to ACK.

Further, the behaviors may also include: The terminal sends HARQ-ACK information to the control node on a corresponding first target resource; and/or the terminal sends HARQ-ACK information to the sending terminal on a corresponding second target resource.

Optionally, if the terminal sends no sidelink transmission on all transmission occasions in K' periods for one configured sidelink grant, in this case, in one embodiment, if the terminal receives, on the second target resource, HARQ-ACK information corresponding to the K' periods of the configured sidelink grant, the terminal determines sidelink information to be sent to the control node, and sends the sidelink information on the corresponding target resource. A method for determining the sidelink information includes: HARQ-ACK bit(s), corresponding to the K' periods of the configured sidelink grant, in the sidelink information is equal to HARQ-ACK information received on the first resource; or an AND operation or BITAND operation is performed on all bits of the HARQ-ACK information received on the first resource, and HARQ-ACK bit(s), corresponding to the K' periods of the configured sidelink grant, in the sidelink information=a result of the AND operation or BITAND operation (for example, in the K' periods of the configured sidelink grant, the terminal receives 4 ACKs, and performs an AND operation or BITAND operation on the 4 ACKs to obtain 1-bit ACK, where the HARQ-ACK bit corresponding to the sidelink transmission in the sidelink information is equal to ACK).

In another embodiment, regardless of whether the terminal receives the HARQ-ACK information on the second target resource, the terminal sets all the HARQ-ACK bit(s), corresponding to the K' periods of the configured sidelink grant, in the sidelink information to ACK, and sends the sidelink information on the corresponding target resource.

Optionally, if the configured sidelink grant uses a dynamic codebook to send the sidelink information to the control node, a period of the target resource corresponding to the configured sidelink grant is the same as a period of the configured sidelink grant (that is, each period P has a corresponding target resource, and sending to the control node is performed in each period).

Optionally, a period of the second target resource corresponding to the configured sidelink grant is the same as the period of the configured sidelink grant or is a factor of the period of the configured sidelink grant (that is, each period P has a corresponding first resource, and feedback is performed in each period).

Optionally, if the terminal sends no sidelink transmission or receives no sidelink transmission on all transmission occasions in K' periods. In this case, the terminal does not send the HARQ-ACK information for the K' periods of the configured sidelink grant (but may send information for other scheduling) on the corresponding target resource. Optionally, K'=1. Alternatively, the terminal sets all HARQ-ACK bit(s) corresponding to the K' periods of the configured sidelink grant to ACK, and sends the sidelink information on the corresponding target resource.

Figure 3:
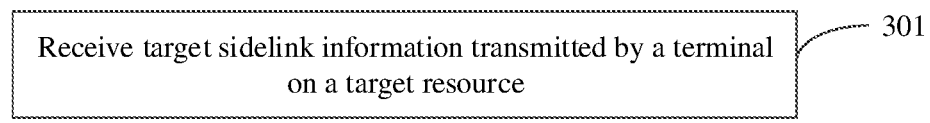
FIG. 3 is a second flowchart of a sidelink information transmission method according to an embodiment of this disclosure.

FIG. 3 is a flowchart of another sidelink information transmission method according to an embodiment of this disclosure. The method is applied to a control node, and as shown in FIG. 3, includes the following steps.

Step 301: Receive target sidelink information transmitted by a terminal on a target resource, where the target sidelink information is first sidelink information corresponding to a first configured sidelink grant, or the target sidelink information is multiplexed information of the first sidelink information and first information; the first information is sidelink information corresponding to other scheduling than the first configured sidelink grant; and the target resource is at least one transmission resource configured in a target resource configuration.

Optionally, in a case that no sidelink transmission is performed in K periods or K transmission occasions, the target sidelink information does not include a first hybrid automatic repeat request HARQ codebook or a HARQ codebook mapped by the first HARQ codebook, and the first HARQ codebook is a HARQ codebook corresponding to a configured sidelink grant; or in a case that no sidelink transmission is performed in K periods or K transmission occasions, the target sidelink information includes the first HARQ codebook or the HARQ codebook mapped by the first HARQ codebook, and all bits of the first HARQ codebook indicate a fixed state; where K is a positive integer.

Optionally, in a case that a sidelink transmission has been performed in K periods or K transmission occasions, the target sidelink information includes a second HARQ codebook or a HARQ codebook mapped by the second HARQ codebook, where the second HARQ codebook is a HARQ codebook corresponding to a configured sidelink grant, and K is a positive integer.

Optionally, the number of bits of the second HARQ codebook is any one of the following:
a first preset value;
the number of first transmission units of an actually-performed sidelink transmission; and
a smaller one of the number of first transmission units and a second preset value.

Optionally, in a case that the number of bits of the second HARQ codebook is the first preset value, target confirmation information indicated by a bit, corresponding to a second transmission unit, in the second HARQ codebook is determined based on a reception and decoding status of the second transmission unit of the sidelink transmission.

Optionally, in a case that decoding of the second transmission unit fails, the target confirmation information is a first value; and/or
in a case that reception of the second transmission unit fails, the target confirmation information is a second value; and/or
in a case that decoding of the second transmission unit is successful, the target confirmation information is an acknowledgment.

Optionally, a HARQ codebook in the target sidelink information is first HARQ-ACK information corresponding to a first sidelink transmission, or information mapped by the first HARQ-ACK information; where
the first sidelink transmission is a sidelink transmission by the terminal.

Optionally, the first HARQ-ACK information is HARQ-ACK information obtained by the terminal.

Optionally, when there are a plurality of pieces of first HARQ-ACK information, the plurality of pieces of first HARQ-ACK information are concatenated.

Optionally, in a case that the terminal does not obtain the first HARQ-ACK information, the first HARQ-ACK information is determined according to at least one of the following:
in a case that a feedback mechanism is mechanism 1, all bits of the first HARQ-ACK information take a third value; and
in a case that the feedback mechanism is mechanism 2, all bits of the first HARQ-ACK information take a fourth value.

Optionally, a HARQ codebook transmitted on the target resource is determined based on an occasion corresponding to a HARQ codebook for a configured sidelink grant.

Optionally, the occasion corresponding to the HARQ codebook for the configured sidelink grant includes at least one of the following: occasions corresponding to HARQ codebooks for configured sidelink grants on different sidelink carriers;
occasions corresponding to HARQ codebooks for configured sidelink grants used for different services
occasions corresponding to HARQ codebooks for configured sidelink grants using different HARQ processes;
occasions corresponding to HARQ codebooks for configured sidelink grants on different BWPs;
occasions corresponding to HARQ codebooks for configured sidelink grants on different resource pools;
occasions corresponding to HARQ codebooks for configured sidelink grants on different subchannels;
occasions corresponding to HARQ codebooks for configured sidelink grants corresponding to different sidelink information feedback resources;
occasions corresponding to HARQ codebooks for configured sidelink grants for different terminals;
occasions corresponding to HARQ codebooks for configured sidelink grants using different transmission types;
occasions corresponding to HARQ codebooks for configured sidelink grants corresponding to different resource identifiers;
occasions corresponding to HARQ codebooks for configured sidelink grants using different resource scheduling types;

occasions corresponding to HARQ codebooks for configured sidelink grants using different transmission modes;

occasions corresponding to HARQ codebooks for configured sidelink grants corresponding to different delays;

occasions corresponding to HARQ codebooks for configured sidelink grants corresponding to different ratios;

occasions corresponding to HARQ codebooks for configured sidelink grants corresponding to different periods;

occasions corresponding to HARQ codebooks for configured sidelink grants corresponding to different frequency division multiplexing FDM identifiers;

occasions corresponding to HARQ codebooks for configured sidelink grants using different feedback mechanisms;

occasions corresponding to HARQ codebooks for configured sidelink grants corresponding to different configured sidelink grant identifiers;

occasions corresponding to HARQ codebooks for configured sidelink grants corresponding to different configured sidelink grant types; and occasions corresponding to HARQ codebooks for configured sidelink grants corresponding to different connections.

Optionally, confirmation information indicated by each bit of a HARQ codebook transmitted on the target resource corresponds to HARQ-ACK information at the occasion corresponding to the HARQ codebook for the configured sidelink grant.

Optionally, a HARQ codebook transmitted on the target resource satisfies at least one of the following conditions:

for one first target configured sidelink grant, an index of a HARQ-ACK bit, corresponding to the first target configured sidelink grant, in the codebook is the same as an index of a first target bit in the codebook, where the first target bit is a HARQ-ACK bit corresponding to the first target configured sidelink grant and to be fed back for the first time after configuration of the first target configured sidelink grant takes effect;

for one second target configured sidelink grant, an index of a HARQ-ACK bit, corresponding to the second target configured sidelink grant, in the codebook is the same as an index of a second target bit in the codebook, where the second target bit is a HARQ-ACK bit corresponding to scheduling signalling for activating the second target configured sidelink grant;

for one second target configured sidelink grant, an index of a HARQ-ACK bit, corresponding to the second target configured sidelink grant, in the codebook is the same as an index of a third target bit in the codebook, where the third target bit is a HARQ-ACK bit corresponding to the second target configured sidelink grant and to be fed back for the first time after the second target configured sidelink grant is activated; and for one second target configured sidelink grant, an index of a HARQ-ACK bit, corresponding to scheduling signaling for deactivating the second target configured sidelink grant, in the codebook is the same as the index of the second target bit in the codebook; where a type of the first target configured sidelink grant is configured sidelink grant type 1, and a type of the second target configured sidelink grant is configured sidelink grant type 2.

Optionally, the target resource includes a transmission resource selected based on a data volume of the target sidelink information.

Optionally, a data volume transmittable by the target resource is greater than or equal to a first data volume.

The first data volume is the data volume of the target sidelink information.

Optionally, the target resource is a transmission resource, with a smallest difference between the transmittable data volume and the first data volume, in a first transmission resource corresponding to the first configured sidelink grant.

Optionally, in a case that the target sidelink information is the multiplexed information, the target resource is any one of the following:

in a case that the first information includes second sidelink information corresponding to at least one second configured sidelink grant, but does not include third sidelink information corresponding to dynamic scheduling, the target resource is a transmission resource corresponding to the first configured sidelink grant or a transmission resource corresponding to the second configured sidelink grant;

in a case that the first information includes the third sidelink information, but does not include the second sidelink information, the target resource is a transmission resource corresponding to the first configured sidelink grant or a transmission resource corresponding to dynamical scheduling; and in a case that the first information includes both the second sidelink information and the third sidelink information, the target resource is a transmission resource corresponding to a configured sidelink grant or a transmission resource corresponding to dynamical scheduling.

Optionally, the first information includes at least one of the following:

second sidelink information corresponding to at least one second configured sidelink grant; and third sidelink information corresponding to dynamical scheduling.

Optionally, in a case that a first resource corresponding to the first sidelink information and a second resource corresponding to the first information satisfy a preset condition, the target sidelink information is the multiplexed information, and the preset condition includes at least one of the following:

the first resource partially or completely overlaps the second resource;

the first resource and the second resource are located in a same target range, and the target range includes at least one of a time domain range and a frequency domain range;

a sum of a total resource quantity of the first resource and a total resource quantity of the second resource is greater than a third preset value;

the total resource quantity of the first resource is greater than a fourth preset value;

the total resource quantity of the second resource is greater than the fourth preset value; and the first resource and the second resource are both long format resources.

Optionally, in a case that both the first sidelink information and the first information include confirmation information, the target sidelink information is the multiplexed information.

It should be noted that this embodiment is used as an implementation of the control node corresponding to the embodiment shown in FIG. 2. For a specific implementation of this embodiment, reference may be made to the related descriptions of the embodiment shown in FIG. 2, and a same beneficial effect is achieved. To avoid repetition, details are not described herein again.

Figure 4:
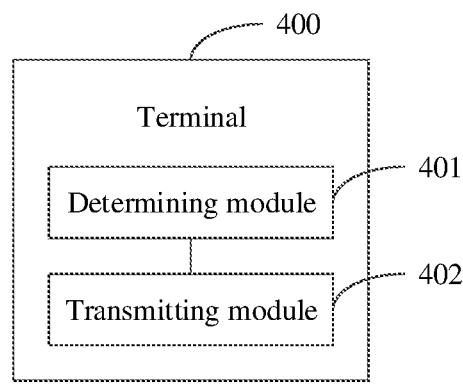
FIG. 4 is a structural diagram of a terminal according to an embodiment of this disclosure.

Referring to FIG. 4, FIG. 4 is a structural diagram of a terminal according to an embodiment of this disclosure. As shown in FIG. 4, the terminal 400 includes:
- a determining module 401, configured to determine a target resource based on a target resource configuration; and
- a transmitting module 402, configured to send target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

Optionally, in a case that no sidelink transmission is performed in K periods or K transmission occasions, the target sidelink information does not include a first hybrid automatic repeat request HARQ codebook or a HARQ codebook mapped by the first HARQ codebook, and the first HARQ codebook is a HARQ codebook corresponding to a configured sidelink grant; or
- in a case that no sidelink transmission is performed in K periods or K transmission occasions, the target sidelink information includes the first HARQ codebook or the HARQ codebook mapped by the first HARQ codebook, and all bits of the first HARQ codebook indicate a fixed state; where
K is a positive integer.

Optionally, in a case that a sidelink transmission has been performed in K periods or K transmission occasions, the target sidelink information includes a second HARQ codebook or a HARQ codebook mapped by the second HARQ codebook, where the second HARQ codebook is a HARQ codebook corresponding to a configured sidelink grant, and K is a positive integer.

Optionally, the number of bits of the second HARQ codebook is any one of the following:
- a first preset value;
- the number of first transmission units of an actually-performed sidelink transmission; and
- a smaller one of the number of first transmission units and a second preset value.

Optionally, in a case that the number of bits of the second HARQ codebook is the first preset value, target confirmation information indicated by a bit, corresponding to a second transmission unit, in the second HARQ codebook is determined based on a reception and decoding status of the second transmission unit of the sidelink transmission.

Optionally, in a case that decoding of the second transmission unit fails, the target confirmation information is a first value; and/or
- in a case that reception of the second transmission unit fails, the target confirmation information is a second value; and/or
- in a case that decoding of the second transmission unit is successful, the target confirmation information is an acknowledgment.

Optionally, a HARQ codebook in the target sidelink information is first HARQ-ACK information corresponding to a first sidelink transmission, or information mapped by the first HARQ-ACK information; where
the first sidelink transmission is a sidelink transmission by the terminal.

Optionally, the first HARQ-ACK information is HARQ-ACK information obtained by the terminal.

Optionally, when there are a plurality of pieces of first HARQ-ACK information, the plurality of pieces of first HARQ-ACK information are concatenated.

Optionally, in a case that the terminal does not obtain the first HARQ-ACK information, the first HARQ-ACK information is determined according to at least one of the following:
- in a case that a feedback mechanism is mechanism 1, all bits of the first HARQ-ACK information take a third value; and
- in a case that the feedback mechanism is mechanism 2, all bits of the first HARQ-ACK information take a fourth value.

Optionally, before the sending the target sidelink information on the target resource, the method further includes:
- based on an occasion corresponding to a HARQ codebook for a configured sidelink grant, determining a HARQ codebook to be transmitted on the target resource.

Optionally, the occasion corresponding to the HARQ codebook for the configured sidelink grant includes at least one of the following: occasions corresponding to HARQ codebooks for configured sidelink grants on different sidelink carriers;
- occasions corresponding to HARQ codebooks for configured sidelink grants used for different services
- occasions corresponding to HARQ codebooks for configured sidelink grants using different HARQ processes;
- occasions corresponding to HARQ codebooks for configured sidelink grants on different BWPs;
- occasions corresponding to HARQ codebooks for configured sidelink grants on different resource pools;
- occasions corresponding to HARQ codebooks for configured sidelink grants on different subchannels;
- occasions corresponding to HARQ codebooks for configured sidelink grants corresponding to different sidelink information feedback resources;
- occasions corresponding to HARQ codebooks for configured sidelink grants for different terminals;
- occasions corresponding to HARQ codebooks for configured sidelink grants using different transmission types;
- occasions corresponding to HARQ codebooks for configured sidelink grants corresponding to different resource identifiers;
- occasions corresponding to HARQ codebooks for configured sidelink grants using different resource scheduling types;
- occasions corresponding to HARQ codebooks for configured sidelink grants using different transmission modes;
- occasions corresponding to HARQ codebooks for configured sidelink grants corresponding to different delays;
- occasions corresponding to HARQ codebooks for configured sidelink grants corresponding to different ratios;
- occasions corresponding to HARQ codebooks for configured sidelink grants corresponding to different periods;
- occasions corresponding to HARQ codebooks for configured sidelink grants corresponding to different frequency division multiplexing FDM identifiers;
- occasions corresponding to HARQ codebooks for configured sidelink grants using different feedback mechanisms;
- occasions corresponding to HARQ codebooks for configured sidelink grants corresponding to different configured sidelink grant identifiers;

occasions corresponding to HARQ codebooks for configured sidelink grants corresponding to different configured sidelink grant types; and occasions corresponding to HARQ codebooks for configured sidelink grants corresponding to different connections.

Optionally, confirmation information indicated by each bit of a HARQ codebook transmitted on the target resource corresponds to HARQ-ACK information at the occasion corresponding to the HARQ codebook for the configured sidelink grant.

Optionally, a HARQ codebook transmitted on the target resource satisfies at least one of the following conditions:

for one first target configured sidelink grant, an index of a HARQ-ACK bit, corresponding to the first target configured sidelink grant, in the codebook is the same as an index of a first target bit in the codebook, where the first target bit is a HARQ-ACK bit corresponding to the first target configured sidelink grant and to be fed back for the first time after configuration of the first target configured sidelink grant takes effect;

for one second target configured sidelink grant, an index of a HARQ-ACK bit, corresponding to the second target configured sidelink grant, in the codebook is the same as an index of a second target bit in the codebook, where the second target bit is a HARQ-ACK bit corresponding to scheduling signalling for activating the second target configured sidelink grant;

for one second target configured sidelink grant, an index of a HARQ-ACK bit, corresponding to the second target configured sidelink grant, in the codebook is the same as an index of a third target bit in the codebook, where the third target bit is a HARQ-ACK bit corresponding to the second target configured sidelink grant and to be fed back for the first time after the second target configured sidelink grant is activated; and for one second target configured sidelink grant, an index of a HARQ-ACK bit, corresponding to scheduling signaling for deactivating the second target configured sidelink grant, in the codebook is the same as the index of the second target bit in the codebook; where a type of the first target configured sidelink grant is configured sidelink grant type 1, and a type of the second target configured sidelink grant is configured sidelink grant type 2.

Optionally, the target resource includes a transmission resource selected based on a data volume of the target sidelink information.

Optionally, a data volume transmittable by the target resource is greater than or equal to a first data volume.

The first data volume is the data volume of the target sidelink information.

Optionally, the target resource is a transmission resource, with a smallest difference between the transmittable data volume and the first data volume, in a first transmission resource corresponding to the first configured sidelink grant.

Optionally, in a case that the target sidelink information is the multiplexed information, the target resource is any one of the following:

in a case that the first information includes second sidelink information corresponding to at least one second configured sidelink grant, but does not include third sidelink information corresponding to dynamic scheduling, the target resource is a transmission resource corresponding to the first configured sidelink grant or a transmission resource corresponding to the second configured sidelink grant;

in a case that the first information includes the third sidelink information, but does not include the second sidelink information, the target resource is a transmission resource corresponding to the first configured sidelink grant or a transmission resource corresponding to dynamical scheduling; and in a case that the first information includes both the second sidelink information and the third sidelink information, the target resource is a transmission resource corresponding to a configured sidelink grant or a transmission resource corresponding to dynamical scheduling.

Optionally, the first information includes at least one of the following:

second sidelink information corresponding to at least one second configured sidelink grant; and third sidelink information corresponding to dynamical scheduling.

Optionally, in a case that a first resource corresponding to the first sidelink information and a second resource corresponding to the first information satisfy a preset condition, the target sidelink information is the multiplexed information, and the preset condition includes at least one of the following:

the first resource partially or completely overlaps the second resource;

the first resource and the second resource are located in a same target range, and the target range includes at least one of a time domain range and a frequency domain range;

a sum of a total resource quantity of the first resource and a total resource quantity of the second resource is greater than a third preset value;

the total resource quantity of the first resource is greater than a fourth preset value;

the total resource quantity of the second resource is greater than the fourth preset value; and the first resource and the second resource are both long format resources.

Optionally, in a case that both the first sidelink information and the first information include confirmation information, the target sidelink information is the multiplexed information.

The terminal provided in this embodiment of this disclosure is capable of implementing the processes implemented by the terminal in the method embodiment in FIG. 4. To avoid repetition, details are not described herein again.

Figure 5:
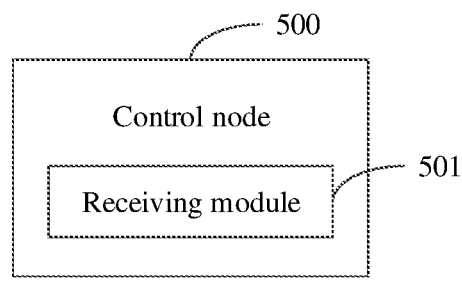
FIG. 5 is a structural diagram of a control node according to an embodiment of this disclosure.

FIG. 5 is a structural diagram of a control node according to an embodiment of this disclosure. As shown in FIG. 5, the control node 500 includes:

a receiving module 501, configured to receive target sidelink information transmitted by a terminal on a target resource, where the target sidelink information is first sidelink information corresponding to a first configured sidelink grant, or the target sidelink information is multiplexed information of the first sidelink information and first information; the first information is sidelink information corresponding to other scheduling than the first configured sidelink grant; and the target resource is at least one transmission resource configured in a target resource configuration.

Optionally, in a case that no sidelink transmission is performed in K periods or K transmission occasions, the target sidelink information does not include a first hybrid automatic repeat request HARQ codebook or a HARQ codebook mapped by the first HARQ codebook, and the first HARQ codebook is a HARQ codebook corresponding to a configured sidelink grant; or in a case that no sidelink transmission is performed in K periods or K transmission occasions, the target sidelink information includes the first HARQ codebook or the HARQ codebook mapped by the first HARQ codebook, and all bits of the first HARQ codebook indicate a fixed state; where K is a positive integer.

Optionally, in a case that a sidelink transmission has been performed in K periods or K transmission occasions, the target sidelink information includes a second HARQ codebook or a HARQ codebook mapped by the second HARQ codebook, where the second HARQ codebook is a HARQ codebook corresponding to a configured sidelink grant, and K is a positive integer.

Optionally, the number of bits of the second HARQ codebook is any one of the following:
 a first preset value;
 the number of first transmission units of an actually-performed sidelink transmission; and
 a smaller one of the number of first transmission units and a second preset value.

Optionally, in a case that the number of bits of the second HARQ codebook is the first preset value, target confirmation information indicated by a bit, corresponding to a second transmission unit, in the second HARQ codebook is determined based on a reception and decoding status of the second transmission unit of the sidelink transmission.

Optionally, in a case that decoding of the second transmission unit fails, the target confirmation information is a first value; and/or
 in a case that reception of the second transmission unit fails, the target confirmation information is a second value; and/or
 in a case that decoding of the second transmission unit is successful, the target confirmation information is an acknowledgment.

Optionally, a HARQ codebook in the target sidelink information is first HARQ-ACK information corresponding to a first sidelink transmission, or information mapped by the first HARQ-ACK information; where
 the first sidelink transmission is a sidelink transmission by the terminal.

Optionally, the first HARQ-ACK information is HARQ-ACK information obtained by the terminal.

Optionally, when there are a plurality of pieces of first HARQ-ACK information, the plurality of pieces of first HARQ-ACK information are concatenated.

Optionally, in a case that the terminal does not obtain the first HARQ-ACK information, the first HARQ-ACK information is determined according to at least one of the following:
 in a case that a feedback mechanism is mechanism 1, all bits of the first HARQ-ACK information take a third value; and
 in a case that the feedback mechanism is mechanism 2, all bits of the first HARQ-ACK information take a fourth value.

Optionally, a HARQ codebook transmitted on the target resource is determined based on an occasion corresponding to a HARQ codebook for a configured sidelink grant.

Optionally, the occasion corresponding to the HARQ codebook for the configured sidelink grant includes at least one of the following: occasions corresponding to HARQ codebooks for configured sidelink grants on different sidelink carriers;
 occasions corresponding to HARQ codebooks for configured sidelink grants used for different services
 occasions corresponding to HARQ codebooks for configured sidelink grants using different HARQ processes;
 occasions corresponding to HARQ codebooks for configured sidelink grants on different BWPs;
 occasions corresponding to HARQ codebooks for configured sidelink grants on different resource pools;
 occasions corresponding to HARQ codebooks for configured sidelink grants on different subchannels;
 occasions corresponding to HARQ codebooks for configured sidelink grants corresponding to different sidelink information feedback resources;
 occasions corresponding to HARQ codebooks for configured sidelink grants for different terminals;
 occasions corresponding to HARQ codebooks for configured sidelink grants using different transmission types;
 occasions corresponding to HARQ codebooks for configured sidelink grants corresponding to different resource identifiers;
 occasions corresponding to HARQ codebooks for configured sidelink grants using different resource scheduling types;
 occasions corresponding to HARQ codebooks for configured sidelink grants using different transmission modes;
 occasions corresponding to HARQ codebooks for configured sidelink grants corresponding to different delays;
 occasions corresponding to HARQ codebooks for configured sidelink grants corresponding to different ratios;
 occasions corresponding to HARQ codebooks for configured sidelink grants corresponding to different periods;
 occasions corresponding to HARQ codebooks for configured sidelink grants corresponding to different frequency division multiplexing FDM identifiers;
 occasions corresponding to HARQ codebooks for configured sidelink grants using different feedback mechanisms;
 occasions corresponding to HARQ codebooks for configured sidelink grants corresponding to different configured sidelink grant identifiers;
 occasions corresponding to HARQ codebooks for configured sidelink grants corresponding to different configured sidelink grant types; and
 occasions corresponding to HARQ codebooks for configured sidelink grants corresponding to different connections.

Optionally, confirmation information indicated by each bit of a HARQ codebook transmitted on the target resource corresponds to HARQ-ACK information at the occasion corresponding to the HARQ codebook for the configured sidelink grant.

Optionally, a HARQ codebook transmitted on the target resource satisfies at least one of the following conditions:
 for one first target configured sidelink grant, an index of a HARQ-ACK bit, corresponding to the first target configured sidelink grant, in the codebook is the same as an index of a first target bit in the codebook, where the first target bit is a HARQ-ACK bit corresponding to the first target configured sidelink grant and to be fed back for the first time after configuration of the first target configured sidelink grant takes effect;
 for one second target configured sidelink grant, an index of a HARQ-ACK bit, corresponding to the second target configured sidelink grant, in the codebook is the same as an index of a second target bit in the codebook, where the second target bit is a HARQ-ACK bit corresponding to scheduling signalling for activating the second target configured sidelink grant;

for one second target configured sidelink grant, an index of a HARQ-ACK bit, corresponding to the second target configured sidelink grant, in the codebook is the same as an index of a third target bit in the codebook, where the third target bit is a HARQ-ACK bit corresponding to the second target configured sidelink grant and to be fed back for the first time after the second target configured sidelink grant is activated; and for one second target configured sidelink grant, an index of a HARQ-ACK bit, corresponding to scheduling signaling for deactivating the second target configured sidelink grant, in the codebook is the same as the index of the second target bit in the codebook; where a type of the first target configured sidelink grant is configured sidelink grant type 1, and a type of the second target configured sidelink grant is configured sidelink grant type 2.

Optionally, the target resource includes a transmission resource selected based on a data volume of the target sidelink information.

Optionally, a data volume transmittable by the target resource is greater than or equal to a first data volume.

The first data volume is the data volume of the target sidelink information.

Optionally, the target resource is a transmission resource, with a smallest difference between the transmittable data volume and the first data volume, in a first transmission resource corresponding to the first configured sidelink grant.

Optionally, in a case that the target sidelink information is the multiplexed information, the target resource is any one of the following:

in a case that the first information includes second sidelink information corresponding to at least one second configured sidelink grant, but does not include third sidelink information corresponding to dynamic scheduling, the target resource is a transmission resource corresponding to the first configured sidelink grant or a transmission resource corresponding to the second configured sidelink grant;

in a case that the first information includes the third sidelink information, but does not include the second sidelink information, the target resource is a transmission resource corresponding to the first configured sidelink grant or a transmission resource corresponding to dynamical scheduling; and in a case that the first information includes both the second sidelink information and the third sidelink information, the target resource is a transmission resource corresponding to a configured sidelink grant or a transmission resource corresponding to dynamical scheduling.

Optionally, the first information includes at least one of the following:

second sidelink information corresponding to at least one second configured sidelink grant; and third sidelink information corresponding to dynamical scheduling.

Optionally, in a case that a first resource corresponding to the first sidelink information and a second resource corresponding to the first information satisfy a preset condition, the target sidelink information is the multiplexed information, and the preset condition includes at least one of the following:

the first resource partially or completely overlaps the second resource;

the first resource and the second resource are located in a same target range, and the target range includes at least one of a time domain range and a frequency domain range;

a sum of a total resource quantity of the first resource and a total resource quantity of the second resource is greater than a third preset value;

the total resource quantity of the first resource is greater than a fourth preset value;

the total resource quantity of the second resource is greater than the fourth preset value; and the first resource and the second resource are both long format resources.

Optionally, in a case that both the first sidelink information and the first information include confirmation information, the target sidelink information is the multiplexed information.

The control node provided in this embodiment of this disclosure is capable of implementing the processes implemented by the control node in the method embodiment in FIG. 3. To avoid repetition, details are not described herein again.

Figure 6:
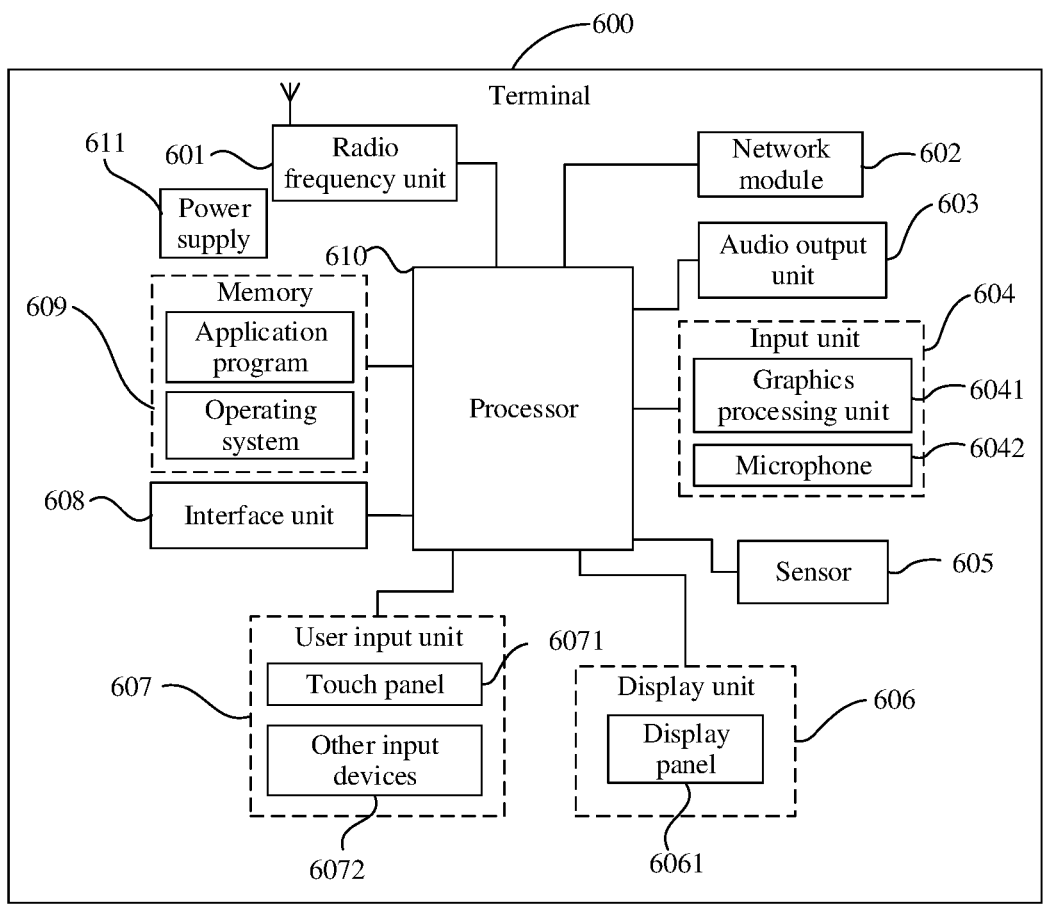
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal device. The terminal may include more or fewer components than those shown in the figure, or a combination of some components, or the components disposed differently. In this embodiment of this disclosure, the terminal includes, but is not limited to, a mobile phone, a tablet computer, a laptop computer, a personal digital assistant, an in-vehicle terminal, a wearable device, a pedometer, and the like.

a processor 610, configured to determine a target resource based on a target resource configuration.

The radio frequency unit 601 is configured to send target sidelink information on the target resource, where the target sidelink information is first sidelink information corresponding to a first configured sidelink grant, or the target sidelink information is multiplexed information of the first sidelink information and first information, where the first information is sidelink information corresponding to other scheduling than the first configured sidelink grant.

In this embodiment of this disclosure, the target resource is determined based on the target resource configuration, and the first sidelink information or the multiplexed information of the first sidelink information and the first information are transmitted on the target resource, thereby clarifying a transmission mode for sidelink information and implementing transmission of sidelink information.

It should be understood that in this embodiment of this disclosure, the radio frequency unit 601 may be configured to: receive and transmit signals in an information receiving/sending process or a call process; and specifically, after receiving downlink data from a base station, transmit the downlink information to the processor 610 for processing, and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal, and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (Graphics Processing Unit, GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal 600 may further include at least one sensor 605, for example, an optical sensor, a motion sensor, and another sensor. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (LCD), an organic light-emitting diode (OLED), or the like.

The user input unit 607 may be configured to receive input digit or character information and generate key signal input related to user setting and function control of the mobile terminal. Specifically, the user input unit 607 may include a touch panel 6071 and other input devices 6072. The touch panel 6071, also referred to as a touchscreen, may capture a touch operation performed by the user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 610, and receives and executes a command transmitted by the processor 610. In addition, the touch panel 6071 may be implemented in a plurality of forms, for example, a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal 600, or may be configured to transmit data between the terminal 600 and the external apparatus.

The memory 609 may be configured to store software programs and various data. The memory 609 may mainly include a program storage region and a data storage region. The program storage region may store an operating system, an application program required for at least one function (such as a sound play function and an image play function), and the like. The data storage region may store data created based on use of the mobile phone (such as audio data and a phone book), and the like. In addition, the memory 609 may include a high-speed random access memory, and may further include a non-volatile memory such as a disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes the operating system, a user interface, the application program, and the like. The modem processor mainly processes wireless communication. It can be understood that the modem processor may alternatively be not integrated in the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, the processes of the DCI transmission method embodiment are implemented, with the same technical effect achieved. To avoid repetition, details are not described herein again.

Figure 7:
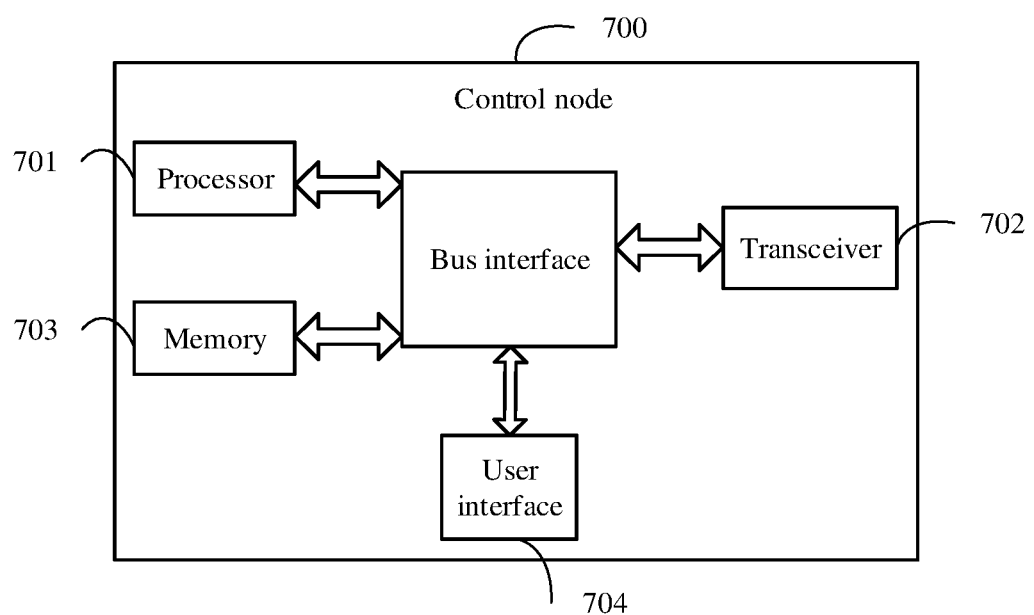
FIG. 7 is a structural diagram of another control node according to an embodiment of this disclosure.

FIG. 7 is a structural diagram of another control node according to an embodiment of this disclosure. As shown in FIG. 7, the control node 700 includes a processor 701, a transceiver 702, a memory 703, and a bus interface.

The transceiver 702 is configured to receive target sidelink information transmitted by a terminal on a target resource, where the target sidelink information is first sidelink information corresponding to a first configured sidelink grant, or the target sidelink information is multiplexed information of the first sidelink information and first information; the first information is sidelink information corresponding to other scheduling than the first configured sidelink grant; and the target resource is at least one transmission resource configured in a target resource configuration.

In this embodiment of this disclosure, the target resource is determined based on the target resource configuration, and the first sidelink information or the multiplexed information of the first sidelink information and the first information are transmitted on the target resource, thereby clarifying a transmission mode for sidelink information and implementing transmission of sidelink information.

In FIG. 7, a bus architecture may include any quantity of interconnected buses and bridges, and specifically connects together circuits that are of one or more processors represented by the processor 701 and of a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of components, including a transmitter and a receiver, and provides units for communicating with a variety of other apparatuses on a transmission medium. For different user equipments, the user interface 704 may also be an interface that can be externally or internally connected to a required device. The connected device includes but is not limited to a keypad, a display, a speaker, a microphone, a joystick, and the like.

The processor 701 is responsible for management of the bus architecture and general processing, and the memory 703 is capable of storing data that is used by the processor 701 during operation.

Optionally, an embodiment of this disclosure further provides a control node, including a processor 701, a memory 703, and a computer program stored in the memory 703 and capable of running on the processor 701. When the computer program is executed by the processor 701, the processes of the foregoing embodiment of the sidelink information transmission method are implemented, with the same technical effect achieved. To avoid repetition, details are not described herein again.

An embodiment of this disclosure further provides a computer-readable storage medium, where a computer program is stored in the computer readable storage medium. When the computer program is executed by a processor, the processes of the foregoing embodiment of the sidelink information transmission method provided in the embodiments of this disclosure are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A sidelink information transmission method, applied to a terminal and comprising:
   determining a target resource based on a target resource configuration, the target resource comprises a physical uplink control channel (PUCCH); and
   sending target sidelink information on the PUCCH, wherein the target sidelink information is corresponding to a first configured sidelink grant,
   the target sidelink information comprises information mapped by a first HARQ-ACK information corresponding to the first configured sidelink grant, when no first HARQ-ACK information has been received by the terminal, the target sidelink information is determined according to at least one of the following:
   when a feedback mechanism is mechanism 1, all bits of the target sidelink information take a third value, the mechanism 1 is for NACK-only feedback, and the third value is ACK; or
   when the feedback mechanism is mechanism 2, all bits of the target sidelink information take a fourth value, the mechanism 2 is for ACK/NACK feedback, and the fourth value is NACK.

2. The method according to claim 1, wherein when no sidelink transmission is performed in K periods or K transmission occasions, the target sidelink information comprises a first HARQ codebook or a HARQ codebook mapped by a first HARQ codebook, and all bits of the first HARQ codebook indicate a fixed state; wherein K is a positive integer.

3. The method according to claim 2, wherein all transmission occasions in K periods are used for transmitting one transport block.

4. The method according to claim 2, wherein when a sidelink transmission has been performed in K periods or K transmission occasions, the target sidelink information comprises a second HARQ codebook or a HARQ codebook mapped by the second HARQ codebook, wherein the second HARQ codebook is a HARQ codebook corresponding to a configured sidelink grant, and K is a positive integer.

5. The method according to claim 4, wherein a number of bits of the second HARQ codebook is any one of the following:
   a first preset value;
   a number of first transmission units of an actually-performed sidelink transmission; and
   a smaller one of the number of first transmission units and a second preset value.

6. A sidelink information transmission method, applied to a control node and comprising:
   receiving target sidelink information transmitted by a terminal on a target resource, the target resource comprises a physical uplink control channel (PUCCH), wherein the target sidelink information is corresponding to a first configured sidelink grant,
   the target sidelink information comprises information mapped by a first HARQ-ACK information corresponding to the first configured sidelink grant, when no first HARQ-ACK information has been received by the terminal, the target sidelink information is determined according to at least one of the following:
   when a feedback mechanism is mechanism 1, all bits of the target sidelink information take a third value, the mechanism 1 is for NACK-only feedback, and the third value is ACK; or
   when the feedback mechanism is mechanism 2, all bits of the target sidelink information take a fourth value, the mechanism 2 is for ACK/NACK feedback.

7. The method according to claim 6, wherein when no sidelink transmission is performed in K periods or K transmission occasions, the target sidelink information comprises a first HARQ codebook or a HARQ codebook mapped by a first HARQ codebook, and all bits of the first HARQ codebook indicate a fixed state; wherein K is a positive integer.

8. The method according to claim 7, wherein all transmission occasions in K periods are used for transmitting one transport block.

9. The method according to claim 7, wherein when a sidelink transmission has been performed in K periods or K transmission occasions, the target sidelink information comprises a second HARQ codebook or a HARQ codebook mapped by the second HARQ codebook, wherein the second HARQ codebook is a HARQ codebook corresponding to a configured sidelink grant, and K is a positive integer.

10. The method according to claim 9, wherein a number of bits of the second HARQ codebook is any one of the following:
    a first preset value;
    a number of first transmission units of an actually-performed sidelink transmission; and
    a smaller one of the number of first transmission units and a second preset value.

11. A terminal, comprising a memory, a processor, and a program stored in the memory and capable of running on the processor, wherein when the program is executed by the processor, the steps of the sidelink information transmission method are implemented, wherein the method comprises:
    determining a target resource based on a target resource configuration, the target resource comprises a physical uplink control channel (PUCCH); and
    sending target sidelink information on the PUCCH, wherein the target sidelink information is corresponding to a first configured sidelink grant,
    the target sidelink information comprises information mapped by a first HARQ-ACK information corresponding to the first configured sidelink grant, when no first HARQ-ACK information has been received by the terminal, the target sidelink information is determined according to at least one of the following:
    when a feedback mechanism is mechanism 1, all bits of the target sidelink information take a third value, the mechanism 1 is for NACK-only feedback, and the third value is ACK; or
    when the feedback mechanism is mechanism 2, all bits of the target sidelink information take a fourth value, the mechanism 2 is for ACK/NACK feedback, and the fourth value is NACK.

12. The terminal according to claim 11, wherein when no sidelink transmission is performed in K periods or K transmission occasions, the target sidelink information comprises a first HARQ codebook or a HARQ codebook mapped by a first HARQ codebook, and all bits of the first HARQ codebook indicate a fixed state; wherein K is a positive integer.

13. The terminal according to claim 12, wherein all transmission occasions in K periods are used for transmitting one transport block.

14. The terminal according to claim 13, wherein a number of bits of the second HARQ codebook is any one of the following:
- a first preset value;
- a number of first transmission units of an actually-performed sidelink transmission; and
- a smaller one of the number of first transmission units and a second preset value.

15. The terminal according to claim 12, wherein when a sidelink transmission has been performed in K periods or K transmission occasions, the target sidelink information comprises a second HARQ codebook or a HARQ codebook mapped by the second HARQ codebook, wherein the second HARQ codebook is a HARQ codebook corresponding to a configured sidelink grant, and K is a positive integer.

* * * * *